United States Patent
Lee et al.

(10) Patent No.: US 10,021,420 B2
(45) Date of Patent: *Jul. 10, 2018

(54) METHOD AND APPARATUS FOR ENTROPY ENCODING/DECODING A TRANSFORM COEFFICIENT

(71) Applicant: SAMSUNG ELECTRONICS CO., LTD., Suwon-si (KR)

(72) Inventors: Bae-Keun Lee, Bucheon-si (KR); Yu-Mi Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 5 days.

This patent is subject to a terminal disclaimer.

(21) Appl. No.: 15/212,359

(22) Filed: Jul. 18, 2016

(65) Prior Publication Data

US 2016/0330483 A1 Nov. 10, 2016

Related U.S. Application Data

(63) Continuation of application No. 13/809,375, filed as application No. PCT/KR2011/005034 on Jul. 8, 2011, now Pat. No. 9,414,063.

(Continued)

(51) Int. Cl.
*H04N 19/46* (2014.01)
*H03M 7/40* (2006.01)
(Continued)

(52) U.S. Cl.
CPC ........... *H04N 19/60* (2014.11); *H04N 19/129* (2014.11); *H04N 19/13* (2014.11); *H04N 19/176* (2014.11);
(Continued)

(58) Field of Classification Search
CPC ....... H04N 19/18; H04N 19/129; H04N 19/46
See application file for complete search history.

(56) References Cited

U.S. PATENT DOCUMENTS 6,614,933 B1 9/2003 Sato
8,189,674 B2 5/2012 Shigemoto et al.
(Continued)

FOREIGN PATENT DOCUMENTS

CN 101321060 A 12/2008
CN 101496289 A 7/2009
(Continued)

OTHER PUBLICATIONS

Davies, T. et al, "Suggestion for a Test Model", Joint Collaborative Team on Video Coding (JCT-VC) of ITU-T SG16 WP3 and ISO/IEC JTC1/SC29/WG11, 1st Meeting: Dresden, Germany, Apr. 15-23, 2010, Document: JCTVC-A033, (hereinafter "Davies"), entire document.*

(Continued)

*Primary Examiner* — Tsion B Owens
*Assistant Examiner* — Alison Slater
(74) *Attorney, Agent, or Firm* — Sughrue Mion, PLLC

(57) ABSTRACT

A method and apparatus for entropy coding and decoding a transformation block are provided. The method of entropy coding a transformation block includes:

determining, according to a certain scan order, a location of a last significant transformation coefficient having a non-zero value from among transformation coefficients included in a transformation block having a certain size; and coding information about the determined location of the last significant transformation coefficient by using a horizontal axis direction location of the last significant transformation coef- (Continued)

ficient and a vertical axis direction location in the transformation block of the last significant transformation coefficient.

4 Claims, 18 Drawing Sheets

Related U.S. Application Data

(60) Provisional application No. 61/362,844, filed on Jul. 9, 2010.

(51) Int. Cl.
| | |
|---|---|
| *H04N 19/60* | (2014.01) |
| *H04N 19/176* | (2014.01) |
| *H04N 19/13* | (2014.01) |
| *H04N 19/129* | (2014.01) |
| *H04N 19/463* | (2014.01) |
| *H04N 19/18* | (2014.01) |
| *H04N 19/91* | (2014.01) |
| *H04N 19/184* | (2014.01) |
| *H04N 19/61* | (2014.01) |
| *H04N 19/96* | (2014.01) |

(52) U.S. Cl.
CPC .......... *H04N 19/18* (2014.11); *H04N 19/184* (2014.11); *H04N 19/463* (2014.11); *H04N 19/61* (2014.11); *H04N 19/91* (2014.11); *H04N 19/96* (2014.11)

(56) References Cited

U.S. PATENT DOCUMENTS

| | | | |
|---|---|---|---|
| 2004/0114683 | A1 | 6/2004 | Schwarz et al. |
| 2005/0123207 | A1 | 6/2005 | Marpe et al. |
| 2007/0036223 | A1 | 2/2007 | Srinivasan |
| 2007/0133676 | A1 | 6/2007 | Lee et al. |
| 2008/0130989 | A1 | 6/2008 | Moriya et al. |
| 2009/0116759 | A1 | 5/2009 | Suzuki et al. |
| 2009/0201995 | A1 | 8/2009 | Schwarz et al. |
| 2009/0226103 | A1 | 9/2009 | Choi et al. |
| 2009/0232204 | A1* | 9/2009 | Lee ..................... H04N 19/176 375/240.02 |
| 2010/0046626 | A1 | 2/2010 | Tu et al. |
| 2011/0134995 | A1 | 6/2011 | An |
| 2012/0140813 | A1 | 7/2012 | Sole Rojals et al. |
| 2016/0277742 | A1 | 9/2016 | Schwarz et al. |

FOREIGN PATENT DOCUMENTS

| | | | |
|---|---|---|---|
| EP | 2 154 894 | A1 | 2/2010 |
| JP | 2003153228 | A | 5/2003 |
| JP | 2005-530375 | A | 10/2005 |
| KR | 1020090099236 | A | 9/2009 |
| KR | 1020090129939 | A | 12/2009 |
| RU | 2 391 794 | C2 | 6/2010 |
| WO | 2010018138 | A1 | 2/2010 |
| WO | 2010054178 | A1 | 5/2010 |
| WO | 2011/053020 | A2 | 5/2011 |
| WO | 2012/075181 | A1 | 6/2012 |
| WO | 2012075193 | A1 | 6/2012 |
| WO | 2012139192 | A2 | 10/2012 |

OTHER PUBLICATIONS

Communication dated Jul. 10, 2015 issued by the European Patent Office in counterpart European Patent Application No. 11803837.1.
Jie Jia et al: "A most probable scan mode decision for h.264/avc inter picture coding", Computer Science and Information Technology, 2009. Aug. 8, 2009, pp. 401-405, XP031527376.
Sole J et al: "Parallel Context Processing for the Significance Map in High Coding Efficiency", 4. JCT-VC Meeting ; 95. MPEG Meeting; Jan. 16, 2011, XP030008302.
Communication dated Jul. 28, 2015 issued by the Japanese Patent Office in couteraprt Japanese Patent Application No. 2013-519577.
"Test Model Under Consideration", Joint Collaborative Team on Video Coding (JCT-VC) of ITU-T SG16 WP3 and ISO/IEC JTC1/SC29/WG11,1st Meeting: Dresden, DE, Jun. 2010, JCTVC-A205_DRAFT003, pp. 1-119; 120 total pgs.
Martin Winken et al., "Description of Video Coding Technology Proposal by Fraunhofer HHI", Joint Collaborative Team on Video Coding (JCT-VC) of ITU-T SG16 WP3 and ISO/IEC JTC1/SC29/WG11,1st Meeting: Dresden, DE, Apr. 2010, JCTVC-A116,pp. 1-17; 18 pgs. total.
Kemal Ugur et al., "Description of video coding technology proposal by Tandberg, Nokia, Ericsson", Joint Collaborative Team on Video Coding (JCT-VC) of ITU-T SG16 WP3 and ISO/IEC JTC1/SC29/WG11,1st Meeting: Dresden, DE, Apr. 2010, JCTVC-A119, pp. 1-12; 13 pgs. total.
Sunil Lee et al., "Efficient coefficient coding method for large transform in VLC mode", Joint Collaborative Team on Video Coding (JCT-VC) of ITU-T SG16 WP3 and ISO/IEC JTC1/SC29/WG11, 3rd Meeting: Guangzhou, CN, Oct. 2010, JCTVC-C210, pp. 1-6; 13 pgs. total.
J. Sole et al., "Parallel context processing for the significance map in high coding efficiency", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D262, pp. 1-4; 5 pgs. total.
Communication dated Aug. 5, 2015 issued by the State Intellectual Property Office of P.R. China in counterpart Chinese Patent Application No. 201180043638.8.
Communication from the Canadian Patent Office dated Nov. 28, 2014, in a counterpart Canadian Application No. 2,804,939.
Communication dated May 28, 2014 issued by the Russian Patent Office in counterpart Russian Patent Application No. 2013105483.
Davies, T. et al., "Suggestion for a Test Model", Joint Collaborative Team on Video Coding (JCT-VC) of ITU-T SG16 WP3 and ISO/IEC JTC1/SC29/WG11 1st Meeting: Dresden, Germany, Apr. 15-23, 2010, Document: JCTVC-A033. Retrieved from the Internet Nov. 19, 2013. Total 59 pages. Retrieved from: http://phenix.int-evry.fr/jct/doc_end_user/documents/1_Dresden/wg11/JCTVC-A033.zip.
Communication from the Australian Patent Office dated Nov. 25, 2013 in a counterpart Australian Application No. 2011274680.
International Search Report dated Feb. 24, 2012 issued in International Application No. PCT/KR2011/005034 (PCT/ISA/210).
Written Opinion dated Feb. 24, 2012 issued in International Application No. PCT/KR2011/005034 (PCT/ISA/237).
Communication dated Nov. 2, 2016, from the European Patent Office in counterpart European Application No. 16180227.7.
Communication dated Nov. 2, 2016, from the European Patent Office in counterpart European Application No. 16180225.1.
Communication dated Oct. 18, 2016, from the Japanese Patent Office in counterpart application No. 2016-005602.
Thomas Wiegand et al., "WD3: Working Draft 3 of High-Efficiency Video Coding", Joint Collaborative Team on Video Coding (JCT-VC) of ITU-T SG16 WP3 and ISO/IEC JTC1/SC29/WG11, 5th Meeting: Geneva, CH, Mar. 16-23, 2011 Document: JCTVC-E603 (33 Pages Total).
Communication dated Nov. 17, 2016, from the European Patent Office in counterpart European Application No. 16180224.4.
Communication dated Nov. 22, 2016, from the European Patent Office in counterpart European Application No. 16180225.1.
Communication dated Nov. 28, 2016, from the Russian Patent Office in counterpart application No. 2014133412/08.
Communication dated Nov. 29, 2016, from the European Patent Office in counterpart European Application No. 16180227.7.
Communication dated Aug. 14, 2017, from the Intellectual Property Office of the Philippines Bureau of Patents in counterpart Application No. 1-2013-500062.
Communication dated Jan. 16, 2018, from the Japanese Patent Office in counterpart application No. 2017-090992.

(56) References Cited

OTHER PUBLICATIONS

Communication dated Mar. 8, 2018, from the Intellectual Property Office of the Philippines Bureau of Patents in counterpart Application No. 1/2013/500062.
Communication dated Apr. 28, 2018, issued by the State Intellectual Property Office of P.R. China in counterpart Chinese application No. 201610305424.8.
Communication dated Apr. 3, 2018, issued by the State Intellectual Property Office of P.R. China in counterpart Chinese application No. 201610304349.3.
Communication dated Apr. 3, 2018, issued by the State Intellectual Property Office of P.R. China in counterpart Chinese application No. 201610305655.9.
Communication dated May 4, 2018, issued by the State Intellectual Property Office of P.R. China in counterpart Chinese application No. 201610305590.8.

* cited by examiner

FIG. 8A
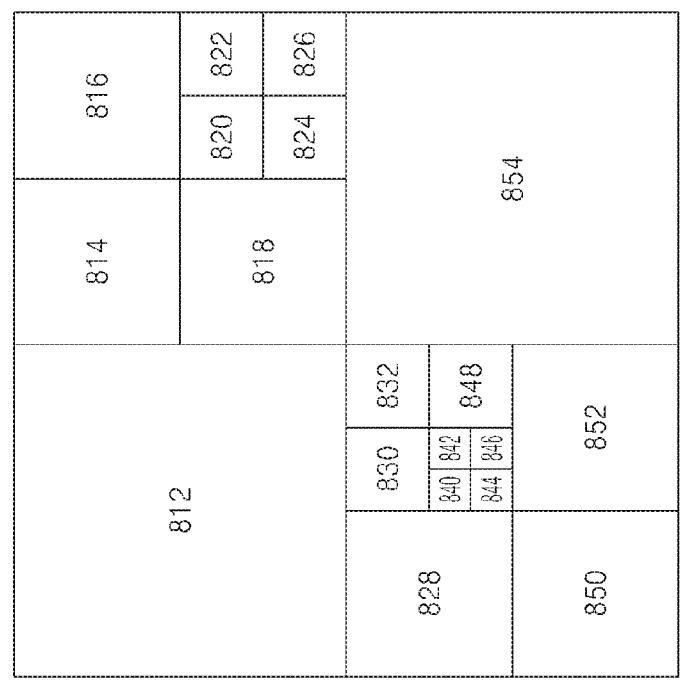
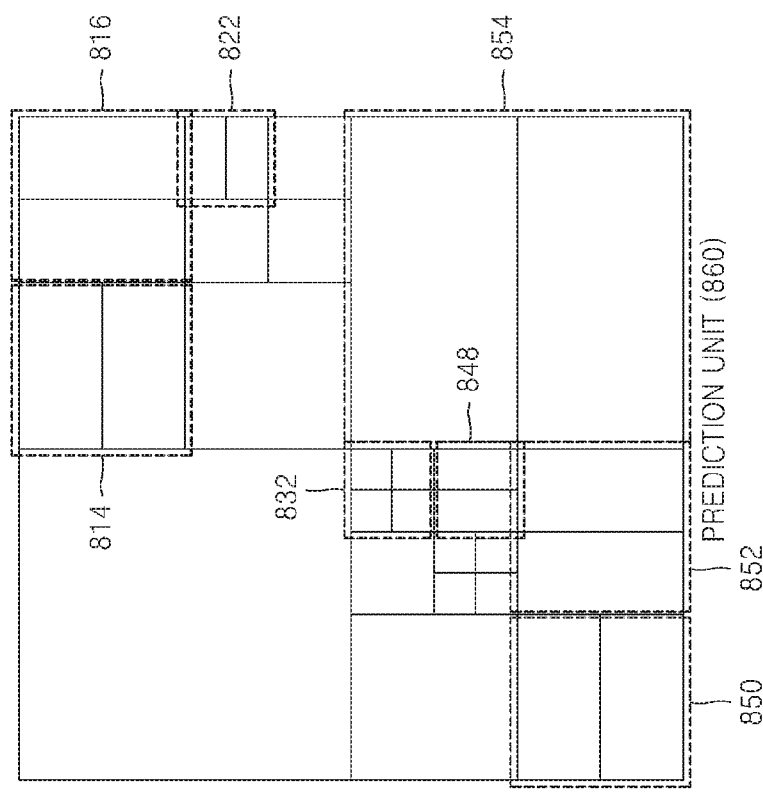

SigMap 1400

| 1 | 1 | 1 | 1 | 0 | 0 | 0 | ... |
| 1 | 0 | 0 | 0 | 0 | 0 | 0 | ... |
| 0 | 0 | 0 | 0 | 0 | 0 | 0 | ... |
| 1 | 0 | 0 | 0 | 0 | 0 | 0 | ... |
| 0 | 0 | 0 | 1 | 0 | 0 | 0 | ... |
| 0 | 0 | 0 | 0 | 0 | 1 | 0 | ... |
| : | : | : | : | : | 0 | : | ... |

FIG. 16

| VLC0 | VLC1 | VLC2 | VLC3 | VLC4 | VLC5 | VLC6 | VLC7 | VLC8 |
|---|---|---|---|---|---|---|---|---|
| 1 | 1x | 1xx | 1xxx | 1xxxx | 1x | 1xx | 1xxx | 1 |
| 01 | 01x | 01xx | 01xxx | 01xxxx | 01x | 01xx | 01xxx | 01 |
| 001 | 001x | 001xx | 001xxx | 001xxxx | 001x | 001xx | 001xxx | 00 |
| 0001 | 0001x | 0001xx | 0001xxx | 0001xxxx | ... | ... | ... | ... |
| 00001 | 00001x | 00001xx | 00001xxx | 00001xxxx | | | | |
| 000001 | 000001x | 000001xx | 000001xxx | 000001xxxx | | | | |
| 0000001 | 0000001x | 0000001xx | 0000001xxx | 0000001xxxx | | | | |
| 00000001 | 00000001x | 00000001xx | 00000001xxx | 00000001xxxx | | | | |
| 000000001 | 000000001x | 000000001xx | 000000001xxx | 000000001xxxx | | | | |
| 0000000001 | 0000000001x | 0000000001xx | 0000000001xxx | 0000000001xxxx | | | | |
| ... | ... | ... | ... | ... | | | | |

FIG. 17

|  SUB BLOCK 1 (1771) |  |  |  | SUB BLOCK 2 (1772) |  |  |  |
|---|---|---|---|---|---|---|---|
| S1,~~1~~ ~~S1~~, 2 | S1,~~6~~ ~~S1~~, 7 | S2, 1 | S2, 2 | S2, 6 | S2, 7 |
| S1, 3 | S1, 5 | S1, 8 | S1, 13 | S3, 3 | S2, 5 | S2, 8 | S2, 13 |
| S1, 4 | S1, 9 | S1, 12 | S1, 14 | S2, 4 | S2, 9 | S2, 12 | S2, 14 |
| S1,~~10~~ ~~S1~~, 11 | S1,~~15~~ ~~S1~~, 16 | S2, 10 | S2, 11 | S2, 15 | S2, 16 |
| S3, 1 | S3, 2 | S3, 6 | S3, 7 | S4, 1 | S4, 2 | S4, 6 | S4, 7 |
| S3, 3 | S3, 5 | S3, 8 | S3, 13 | S4, 3 | S4, 5 | S4, 8 | S4, 13 |
| S3, 4 | S3, 9 | S3, 12 | S3, 14 | S4, 4 | S4, 9 | S4, 12 | S4, 14 |
| S3, 10 | S3, 11 | S3, 15 | S3, 16 | S4, 10 | S4, 11 | S4, 15 | S4, 16 |

SUB BLOCK 3 (1773)    SUB BLOCK 4 (1774)

METHOD AND APPARATUS FOR ENTROPY ENCODING/DECODING A TRANSFORM COEFFICIENT

CROSS-REFERENCE TO RELATED APPLICATIONS

This application is a continuation application of U.S. patent application Ser. No. 13/809,375, filed on Jan. 25, 2013, which is a National Stage application under 35 U.S.C. § 371 of International Application No. PCT/KR2011/005034, filed on Jul. 8, 2011, and claims the benefit of U.S. Provisional Application No. 61/362,844, filed on Jul. 9, 2010 in the United States Patent and Trademark Office, the disclosures of which are incorporated herein in their entirety by reference.

BACKGROUND

1. Field

Apparatuses and methods consistent with exemplary embodiments relate to entropy coding and decoding of transformation coefficients, and more particularly, to a method and apparatus for efficiently entropy coding and decoding information about a location of a last significant transformation coefficient in a transformation block.

2. Description of the Related Art

According to international video coding standards such as H.264 and MPEG-4, a video signal is hierarchically split into sequences, frames, slices, macro blocks, and blocks, and the block is a minimum processing unit. In a coding process, residual data of a block is obtained by performing intra-frame or inter-frame prediction. Also, the residual data is compressed by performing transformation, quantization, scanning, run length coding, and entropy coding. A decoding process is an inverse process of the coding process. Initially, coefficients of a transformation block, which are generated in an entropy coding process, are extracted from a bit stream. Then, residual data of a block is reconfigured by performing inverse quantization and inverse transformation, and prediction information is used to reconfigure video data of the block.

SUMMARY

One or more exemplary embodiments provide a method and apparatus for efficiently entropy coding and decoding information about a location of a last significant transformation coefficient in a transformation block having a large size.

According to aspects of one or more exemplary embodiments, information about a location of a last significant transformation coefficient in a transformation block is coded by using its horizontal axis direction location and its vertical axis direction location in the transformation block.

According to an aspect of an exemplary embodiment, a location of a last significant transformation coefficient included in a transformation block having a large size may be efficiently represented, and information about the location of the last significant transformation coefficient may be decoded independently from a process of decoding transformation coefficients.

According to an aspect of an exemplary embodiment, there is provided a method of entropy coding transformation coefficients, the method including: determining a location of a last significant transformation coefficient having a non-zero value from among transformation coefficients included in a transformation block having a certain size, according to a certain scan order; and coding information about the location of the last significant transformation coefficient by using its horizontal axis direction location and its vertical axis direction location in the transformation block.

According to an aspect of another exemplary embodiment, there is provided a method of entropy decoding transformation coefficients, the method including: extracting information about a horizontal axis direction location and a vertical axis direction location of a last significant transformation coefficient having a non-zero value and included in a transformation block, from a received bitstream according to a certain scan order; and determining a location of the last significant transformation coefficient by decoding the information about the horizontal axis direction location and the vertical axis direction location.

According to an aspect of another exemplary embodiment, there is provided an apparatus for entropy coding transformation coefficients, the apparatus including: an entropy coder for determining a location of a last significant transformation coefficient having a non-zero value from among transformation coefficients included in a transformation block having a certain size, according to a certain scan order, and for coding information about the location of the last significant transformation coefficient by using its horizontal axis direction location and its vertical axis direction location in the transformation block.

According to an aspect of another exemplary embodiment, there is provided an apparatus for entropy decoding transformation coefficients, the apparatus including: an entropy decoder for extracting information about a horizontal axis direction location and a vertical axis direction location of a last significant transformation coefficient having a non-zero value and included in a transformation block, from a received bitstream according to a certain scan order, and for determining a location of the last significant transformation coefficient by decoding the information about the horizontal axis direction location and the vertical axis direction location.

BRIEF DESCRIPTION OF THE DRAWINGS

The above and other features and advantages will become more apparent by describing in detail exemplary embodiments with reference to the attached drawings in which:

FIGS. 8A and 8B are diagrams showing split shapes of coding units, prediction units, and transformation units, according to an exemplary embodiment;

FIG. 13 is a reference diagram for describing a process of selecting a context for coding information about a location of a last significant transformation coefficient, according to an exemplary embodiment;

FIG. 14 shows a significance map corresponding to FIG. 10;

FIG. 16 is diagram showing an example of a plurality of variable length coding (VLC) tables used according to an exemplary embodiment;

FIG. 17 is a reference diagram for describing a method of entropy coding transformation coefficients, according to another exemplary embodiment;

DETAILED DESCRIPTION OF EXEMPLARY EMBODIMENTS

Hereinafter, exemplary embodiments will be described in detail with reference to the attached drawings.

Figure 1:
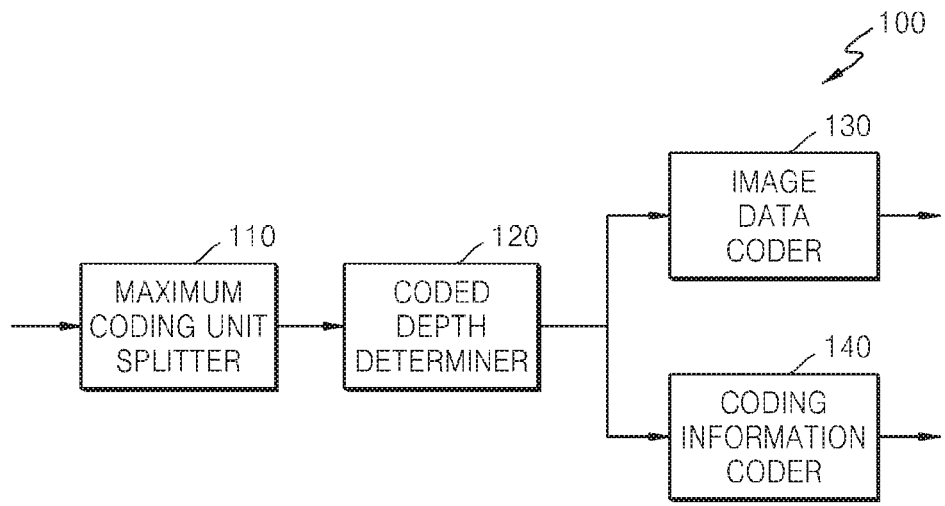
FIG. 1 is a block diagram of an image coding apparatus according to an exemplary embodiment.

FIG. 1 is a block diagram of an image coding apparatus 100 according to an exemplary embodiment.

Referring to FIG. 1, the image coding apparatus 100 includes a maximum coding unit splitter 110, a coded depth determiner 120, an image data coder 130, and a coding information coder 140.

The maximum coding unit splitter 110 may split a current frame or a current slice based on a maximum coding unit that is a maximum-sized coding unit. The current frame or the current slice may be split into at least one maximum coding unit.

According to an exemplary embodiment, coding units may be represented by using a maximum coding unit and a depth. As described above, a maximum coding unit represents a coding unit having the largest size from among coding units of the current frame, and a depth represents how coding units are hierarchically reduced in size. As a depth deepens, coding units may be reduced in size from a maximum coding unit to a minimum coding unit, and a depth of the maximum coding unit may be defined as a minimum depth while the depth of the minimum coding unit may be defined as a maximum depth. Since coding units are reduced in size as the depth deepens from the maximum coding unit, a sub coding unit having a depth of k may include a plurality of sub coding units having depths greater than k.

When a frame to be coded has a large size, if an image is coded in a large unit, the image may be coded at a high image compression rate. However, if the size of a coding unit is increased and is fixed, an image may not be efficiently coded by reflecting its continuously changing characteristics.

For example, when a flat image, e.g., an image of the sea or the sky, is coded, a compression rate may be improved if a coding unit is increased in size. However, when a complicated image, e.g., an image of people or buildings, is coded, the compression rate is improved if the coding unit is reduced in size.

For this, according to an exemplary embodiment, different-sized maximum coding units and different maximum depths are set to different frames or slices. Since a maximum depth denotes the maximum number of times that a coding unit is reducible in size, the size of minimum coding units included in a maximum coding unit may be variably set according to a maximum depth.

The coded depth determiner 120 determines a maximum depth. The maximum depth may be determined based on rate-distortion (R-D) costs. The maximum depth may be determined differently to each frame or slice, or to each maximum coding unit. Information about the determined maximum depth is output to the coding information coder 140, and image data of each maximum coding unit is output to the image data coder 130.

The maximum depth refers to a coding unit having the smallest size in a maximum coding unit, i.e., a minimum coding unit. In other words, the maximum coding unit may be split into different-sized sub coding units according to different depths. Detailed descriptions thereof will be provided below with reference to FIGS. 8A and 8B. Also, the different-sized sub coding units included in the maximum coding unit may be predicted or orthogonally transformed based on different-sized processing units. In other words, the image coding apparatus 100 may perform a plurality of processes for image coding based on various-sized and various-shaped processing units. When three processes such as prediction, orthogonal transformation, and entropy coding are performed to code image data, the same-sized processing unit may be used in all processes or different-sized processing units may be used in different processes.

For example, the image coding apparatus 100 may select a processing unit different from a certain (e.g., predetermined) coding unit in order to predict the coding unit.

If a coding unit has a size of 2N×2N (N is a positive integer), a processing unit for prediction may have a size of 2N×2N, 2N×N, N×2N, N×N, etc. In other words, motion prediction may be performed based on a processing unit having a size obtained by dividing at least one of a height and width of a coding unit in half. Hereinafter, a processing unit for prediction is referred to as a 'prediction unit'.

A prediction mode may be at least one of an intra mode, an inter mode, and a skip mode, and a certain prediction mode may be performed on only a certain-sized or certain-shaped prediction unit. For example, an intra mode may be performed on only a prediction unit having a size of 2N×2N or N×N having a square shape. Also, a skip mode may be performed on only a prediction unit having a size of 2N×2N. If a coding unit includes a plurality of prediction units, prediction may be performed on every prediction unit and a prediction unit having a least coding error may be may be selected.

Also, the image coding apparatus 100 may orthogonally transform image data based on a processing unit having a size different from the size of a coding unit. The coding unit may be orthogonally transformed based on a data unit having a size less than or equal to the size of the coding unit.

Hereinafter, a processing unit for orthogonal transformation is referred to as a 'transformation unit'.

The coded depth determiner 120 may determine sub coding units included in the maximum coding unit, by using rate-distortion optimization based on a Lagrange multiplier. In other words, a split shape of the maximum coding unit into a plurality of sub coding units may be determined. Here, the plurality of sub coding units have different sizes according to depths. After that, the image data coder 130 outputs a bitstream by coding the maximum coding unit based on the split shape determined by the coded depth determiner 120.

The coding information coder 140 codes information about a coding mode of the maximum coding unit, which is determined by the coded depth determiner 120. The bitstream is output by coding information about the split shape of the maximum coding unit, information about the maximum depth, and information about coding modes of sub coding units according to depths. The information about the coding modes of the sub coding units may include, for example, information about prediction units of the sub coding units, information about prediction modes of the prediction units, and information about transformation units of the sub coding units.

The information about the split shape of the maximum coding unit may be information representing whether each coding unit is split. For example, when the maximum coding unit is split and coded, information representing whether the maximum coding unit is split is coded. Also, when sub coding units generated by splitting the maximum coding unit are split and coded, information representing whether each sub coding unit is split is coded. Information representing whether a coding unit is split may be flag information representing whether the coding unit is split.

Since the maximum coding unit includes different-sized sub coding units and information about a coding mode of each sub coding unit has to be determined, information about at least one coding mode may be determined with respect to one maximum coding unit.

The image coding apparatus 100 may generate sub coding units by dividing a height and width of the maximum coding unit as a depth deepens. That is, if a coding unit having a depth of k has a size of 2N×2N, a coding unit having a depth of k+1 has a size of N×N.

Accordingly, the image coding apparatus 100 may determine an optimal split shape of each maximum coding unit based on the size of the maximum coding unit and a maximum depth in consideration of image characteristics. By variably adjusting the size of the maximum coding unit and coding an image by splitting the maximum coding unit into sub coding units having different depths in consideration of image characteristics, images having various resolutions may be efficiently coded.

Figure 2:
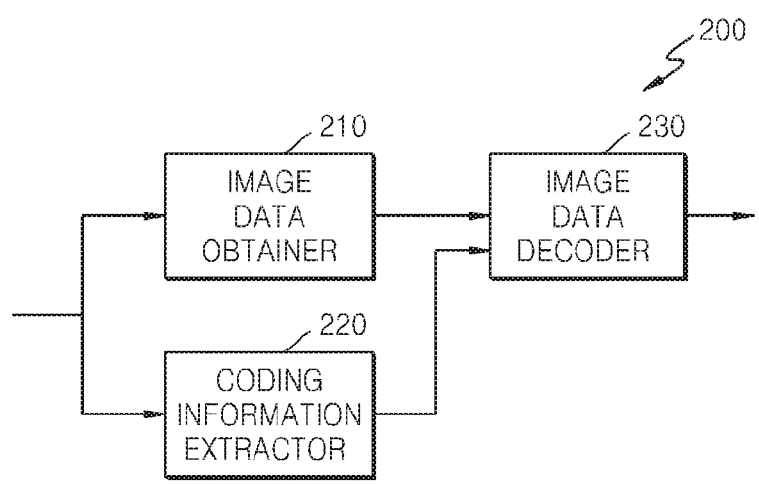
FIG. 2 is a block diagram of an image decoding apparatus according to an exemplary embodiment.

FIG. 2 is a block diagram of an image decoding apparatus 200 according to an exemplary embodiment.

Referring to FIG. 2, the image decoding apparatus 200 includes an image data obtainer 210, a coding information extractor 220, and an image data decoder 230.

The image data obtainer 210 parses a bitstream received by the image decoding apparatus 200, and obtains and outputs image data of each maximum coding unit to the image data decoder 230. The image data obtainer 210 may extract information about the maximum coding unit of a current frame or slice from a header of the current frame or slice. In other words, the bitstream is split into maximum coding units to allow the image data decoder 230 to decode image data of each maximum coding unit.

The coding information extractor 220 parses the bitstream received by the image decoding apparatus 200, and extracts from the header of the current frame information about a maximum coding unit, a maximum depth, a split shape of the maximum coding unit, and coding modes of sub coding units. The information about the split shape and the coding modes is output to the image data decoder 230.

The information about the split shape of the maximum coding unit may include information about sub coding units included in the maximum coding unit and having different sizes according to depths. As described above in relation to FIG. 1, the information about the split shape may be information coded and representing whether each coding unit is split (for example, flag information). The information about the coding modes may include, for example, information about prediction units, information about prediction modes, information about transformation units of sub coding units.

The image data decoder 230 restores the current frame by decoding image data of each maximum coding unit based on the information extracted by the coding information extractor 220.

The image data decoder 230 may decode sub coding units included in the maximum coding unit, based on the information about the split shape of the maximum coding unit. A decoding process may include an inter prediction process including intra prediction and motion compensation, and an inverse orthogonal transformation process.

The image data decoder 230 may perform intra prediction or inter prediction based on the information about the prediction units and the information about the prediction modes of the sub coding units, in order to predict the sub coding units. Also, the image data decoder 230 may perform inverse orthogonal transformation on every sub coding unit based on the information about the transformation units of the sub coding units.

Figure 3:
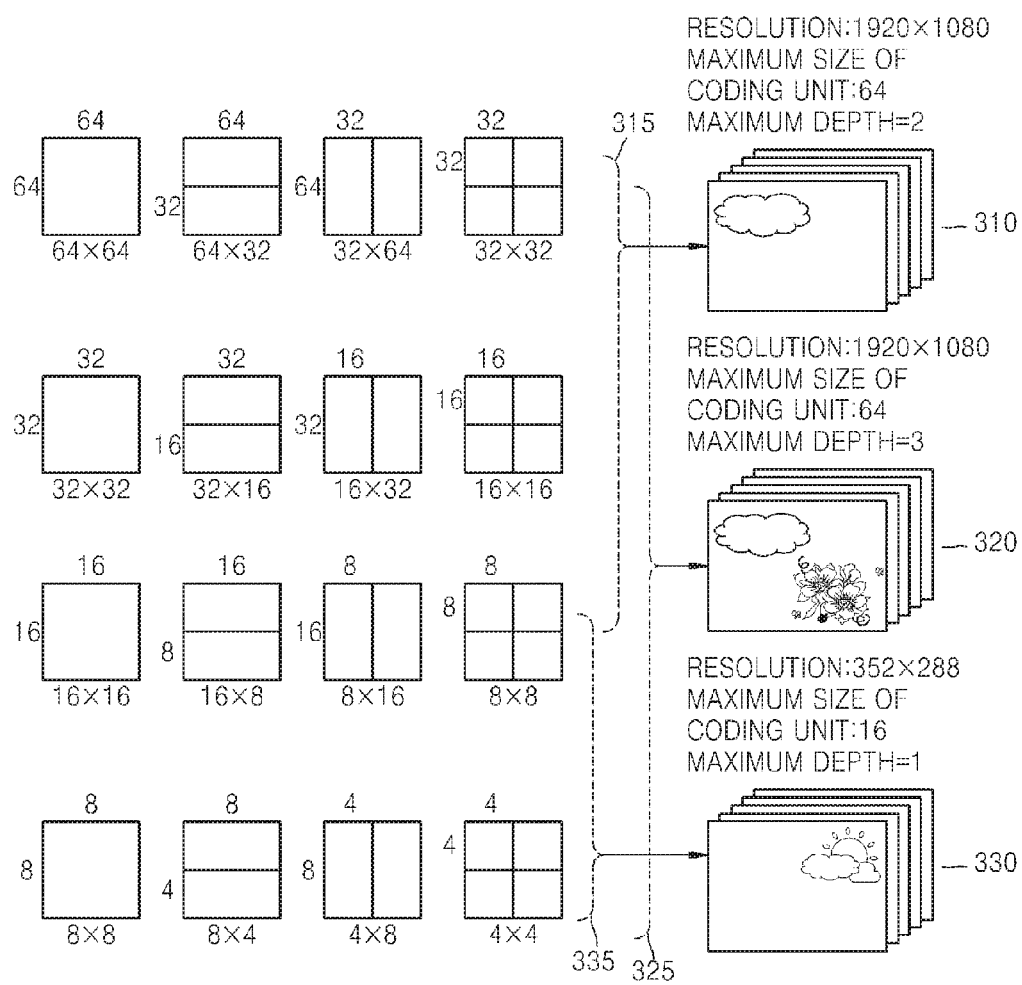
FIG. 3 is a diagram showing hierarchical coding units according to an exemplary embodiment.

FIG. 3 is a diagram showing hierarchical coding units according to an exemplary embodiment.

Referring to FIG. 3, the hierarchical coding units may include coding units having width×height of 64×64, 32×32, 16×16, 8×8, and 4×4. In addition to the square-shaped coding units, coding units having width×height of 64×32, 32×64, 32×16, 16×32, 16×8, 8×16, 8×4, and 4×8 may also exist.

In FIG. 3, to image data 310 having a resolution of 1920×1080, the size of a maximum coding unit is set as 64×64 and a maximum depth is set as 2.

To another image data 320 having a resolution of 1920×1080, the size of the maximum coding unit is set as 64×64 and the maximum depth is set as 4. To image data 330 having a resolution of 352×288, the size of the maximum coding unit is set as 16×16 and the maximum depth is set as 2.

If a resolution is high or the amount of data is large, in order to improve a compression rate and to accurately reflect image characteristics, a maximum coding size may be relatively large. Accordingly, for the image data 310 and 320 having a resolution higher than the resolution of the image data 330, the size of the maximum coding unit may be selected as 64×64.

The maximum depth represents a total number of layers of the hierarchical coding units. Since the maximum depth of the image data 310 is 2, coding units 315 of the image data 310 may include a maximum coding unit having a long axis size of 64, and sub coding units having long axis sizes of 32 and 16 as a depth deepens.

Meanwhile, since the maximum depth of the image data 330 is 2, coding units 335 of the image data 330 may include maximum coding units having a long axis size of 16, and sub coding units having long axis sizes of 8 and 4 as a depth deepens.

Since the maximum depth of the image data 320 is 4, coding units 325 of the image data 320 may include a maximum coding unit having a long axis size of 64, and sub coding units having long axis sizes of 32, 16, 8, and 4 as a depth deepens. As such, since an image is coded based on a small sub coding unit as a depth deepens, an image including a detailed scene may be appropriately coded.

Figure 4:
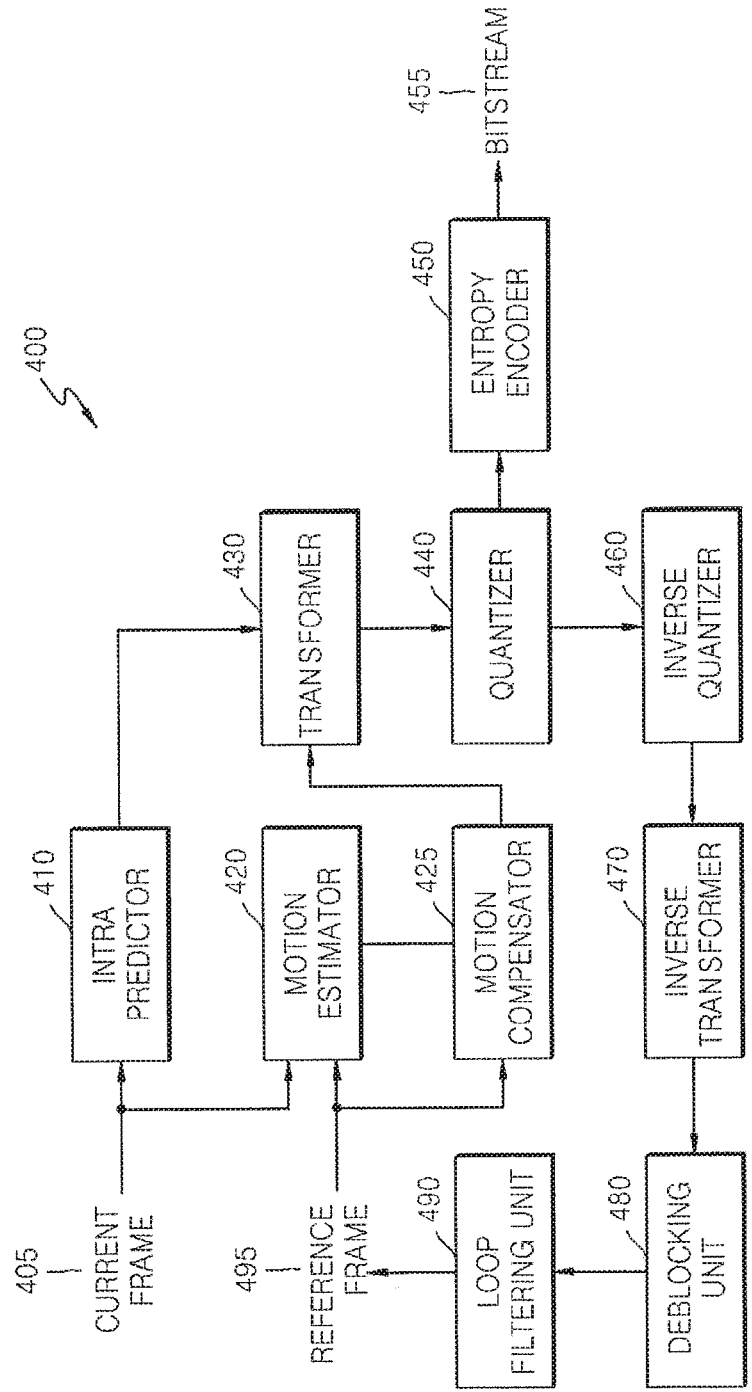
FIG. 4 is a block diagram of an image coder based on coding units, according to an exemplary embodiment.

FIG. 4 is a block diagram of an image coder 400 based on coding units, according to an exemplary embodiment.

An intra predictor 410 performs intra prediction on prediction units of an intra mode in a current frame 405, a motion estimator 420 and a motion compensator 425 respectively perform inter prediction and motion compensation on prediction units of an inter mode by using the current frame 405 and a reference frame 495.

Residual values are generated based on the prediction units output from the intra predictor 410, the motion estimator 420, and the motion compensator 425, and the generated residual values pass through an orthogonal transformer 430 and a quantizer 440 so as to be output as quantized transformation coefficients.

The quantized transformation coefficients pass through an inverse quantizer 460 and an inverse frequency transformer 470 so as to be restored as residual values, and the restored residual values post-processed through a deblocker 480 and a loop filter 490 so as to be output as the reference frame 495. The quantized transformation coefficients may also pass through an entropy coder 450 so as to be output as a bitstream 455.

In order to code an image based on an image coding method according to an exemplary embodiment, all components of the image coder 400, i.e., the intra predictor 410, the motion estimator 420, the motion compensator 425, the orthogonal transformer 430, the quantizer 440, the entropy coder 450, the inverse quantizer 460, the inverse frequency transformer 470, the deblocker 480, and the loop filter 490, perform image coding processes based on a maximum coding unit, sub coding units according to depths, prediction units, and transformation units.

Figure 5:
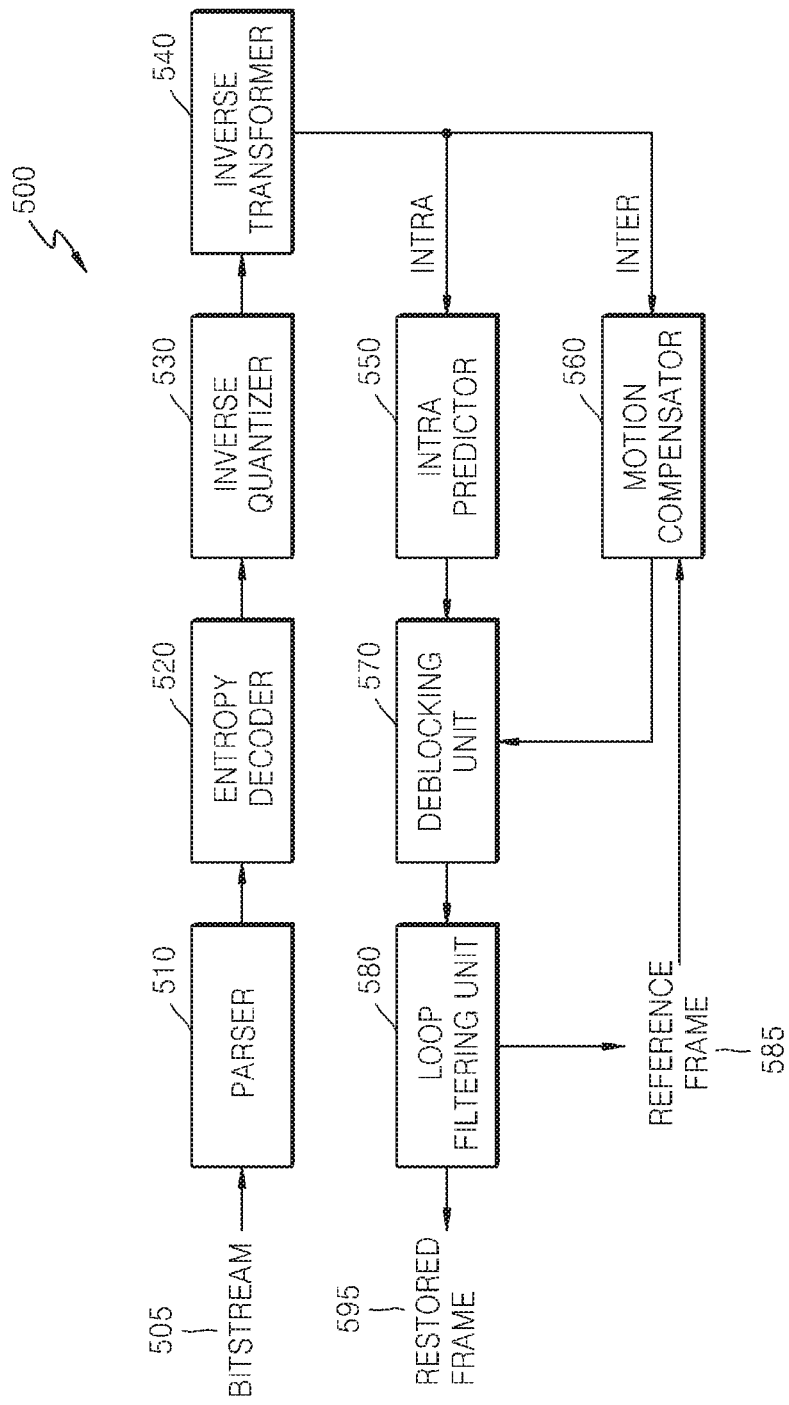
FIG. 5 is a block diagram of an image decoder based on coding units, according to an exemplary embodiment.

FIG. 5 is a block diagram of an image decoder 500 based on coding units, according to an exemplary embodiment.

A bitstream 505 passes through a parser 510 so as to be parsed into coded image data to be decoded, and coding information required to decode the coded image data. The coded image data passes through an entropy decoder 520 and an inverse quantizer 530 so as to be output as inversely quantized data, and passes through an inverse frequency transformer 540 so as to be restored as residual values. The residual values are added to a result of intra prediction performed by an intra predictor 550 and a result of motion compensation performed by a motion compensator 560, so as to be restored to coding units. The restored coding units pass through a deblocker 570 and a loop filter 580 so as to be used to decode next coding units or to predict a next frame.

In order to decode an image based on an image decoding method according to an exemplary embodiment, all components of the image decoder 500, i.e., the parser 510, the entropy decoder 520, the inverse quantizer 530, the inverse frequency transformer 540, the intra predictor 550, the motion compensator 560, the deblocker 570, and the loop filter 580, perform image decoding processes based on a maximum coding unit, sub coding units according to depths, prediction units, and transformation units.

In particular, the intra predictor 550 and the motion compensator 560 determine prediction units in the sub coding units, and prediction modes in consideration of the maximum coding unit and the depths, and the inverse frequency transformer 540 performs inverse orthogonal transformation in consideration of the sizes of the transformation units.

Figure 6:
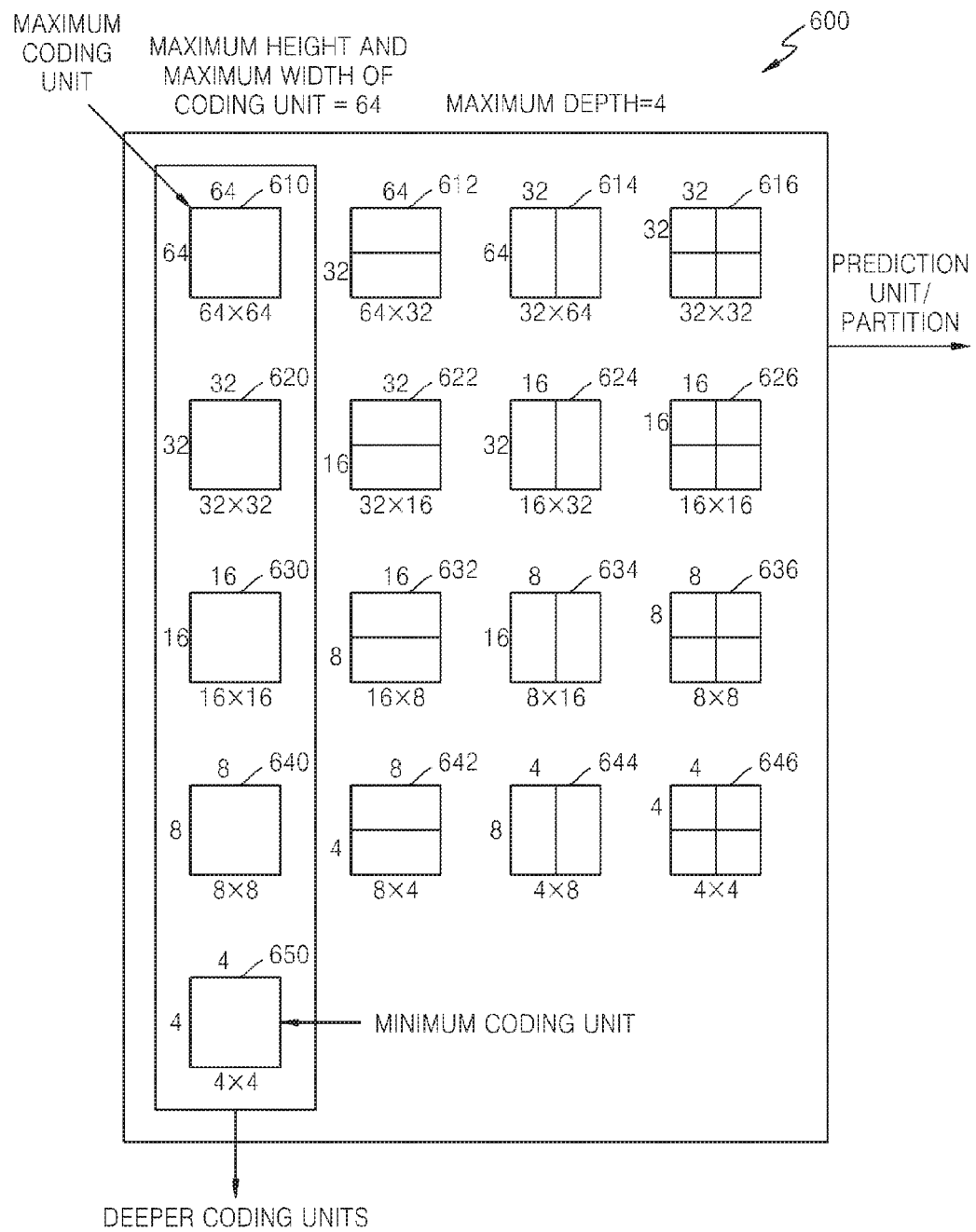
FIG. 6 is a diagram showing maximum coding units, sub coding units, and prediction units, according to an exemplary embodiment.

FIG. 6 is a diagram showing maximum coding units, sub coding units, and prediction units, according to an exemplary embodiment.

The image coding apparatus 100 illustrated in FIG. 1 and the image decoding apparatus 200 illustrated in FIG. 2 use hierarchical coding units in order to perform coding and decoding in consideration of image characteristics. A maximum coding unit and a maximum depth may be adaptively set according to image characteristics, or may be variously set according to requests of a user.

FIG. 6 illustrates a hierarchical structure 600 of coding units in which a height and width of a maximum coding unit 610 are 64 and 64, and a maximum depth is 4. A depth deepens according to a vertical axis of the hierarchical structure 600 of coding units, and widths and heights of sub coding units 620, 630, 640, and 650 are reduced as the depth deepens. Also, along a horizontal axis of the hierarchical structure 600 of coding units, prediction units of the maximum coding unit 610 and the sub coding units 620, 630, 640, and 650 are illustrated.

The maximum coding unit 610 has a depth of 0 and has a size, i.e., width×height, of 64×64. The depth deepens along the vertical axis, and the sub coding unit 620 having a size of 32×32 and a depth of 1, the sub coding unit 630 having a size of 16×16 and a depth of 2, the sub coding unit 640 having a size of 8×8 and a depth of 3, and the sub coding unit 650 having a size of 4×4 and a depth of 4 exist. The sub coding unit 650 having a size of 4×4 and a depth of 4 is a minimum coding unit.

Referring to FIG. 6, examples of prediction units according to depths are illustrated along a horizontal axis. That is, the maximum coding unit 610 having a depth of 0 may include a prediction unit 610 having a size of 64×64, a prediction unit 612 having a size of 64×32, a prediction unit 614 having a size of 32×64, a prediction unit 616 having a size of 32×32, of which sizes are equal to or less than the size of the coding unit 610, i.e., 64×64

The coding unit 620 having a depth of 1 and a size of 32×32 may include a prediction unit 620 having a size of 32×32, a prediction unit 622 having a size of 32×16, a prediction unit 624 having a size of 16×32, a prediction unit 626 having a size of 16×16, of which sizes are equal to or less than the size of the coding unit 620, i.e., 32×32.

The coding unit 630 having a depth of 2 and a size of 16×16 may include a prediction unit 630 having a size of 16×16, a prediction unit 632 having a size of 16×8, a prediction unit 634 having a size of 8×16, a prediction unit 636 having a size of 8×8, of which sizes are equal to or less than the size of the coding unit 630, i.e., 16×16.

The coding unit 640 having a depth of 3 and a size of 8×8 may include a prediction unit 640 having a size of 8×8, a prediction unit 642 having a size of 8×4, a prediction unit 644 having a size of 4×8, a prediction unit 646 having a size of 4×4, of which sizes are equal to or less than the size of the coding unit 640, i.e., 8×8.

Lastly, the coding unit 650 having a depth of 4 and a size of 4×4 has a maximum depth and includes a prediction unit 650 having a size of 4×4. However, the coding unit 650 having the maximum depth does not inevitably need to include a prediction unit having a size equal to the size of the coding unit, and may be, like the other coding units 610, 620, 630, and 640, split for prediction into prediction units having a size less than the size of the coding unit.

Figure 7:
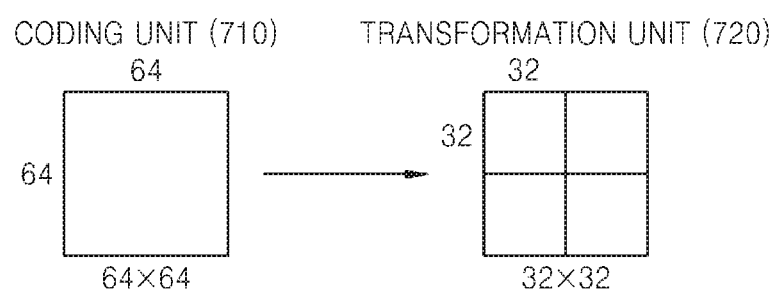
FIG. 7 is a diagram showing a coding unit and a transformation unit, according to an exemplary embodiment.

FIG. 7 is a diagram showing a coding unit and a transformation unit, according to an exemplary embodiment.

The image coding apparatus 100 illustrated in FIG. 1 and the image decoding apparatus 200 illustrated in FIG. 2 code a maximum coding unit or sub coding units split from and having sizes less than the size of the maximum coding unit. The size of a transformation unit for performing orthogonal transformation in a coding process may be selected to achieve the highest compression rate regardless of a coding unit and a prediction unit. For example, if a current coding unit 710 has a size of 64×64, orthogonal transformation may be performed by using a transformation unit 720 having a size of 32×32. Also, a transformation unit having a size greater than the size of a coding unit may be set.

Figure 8B:
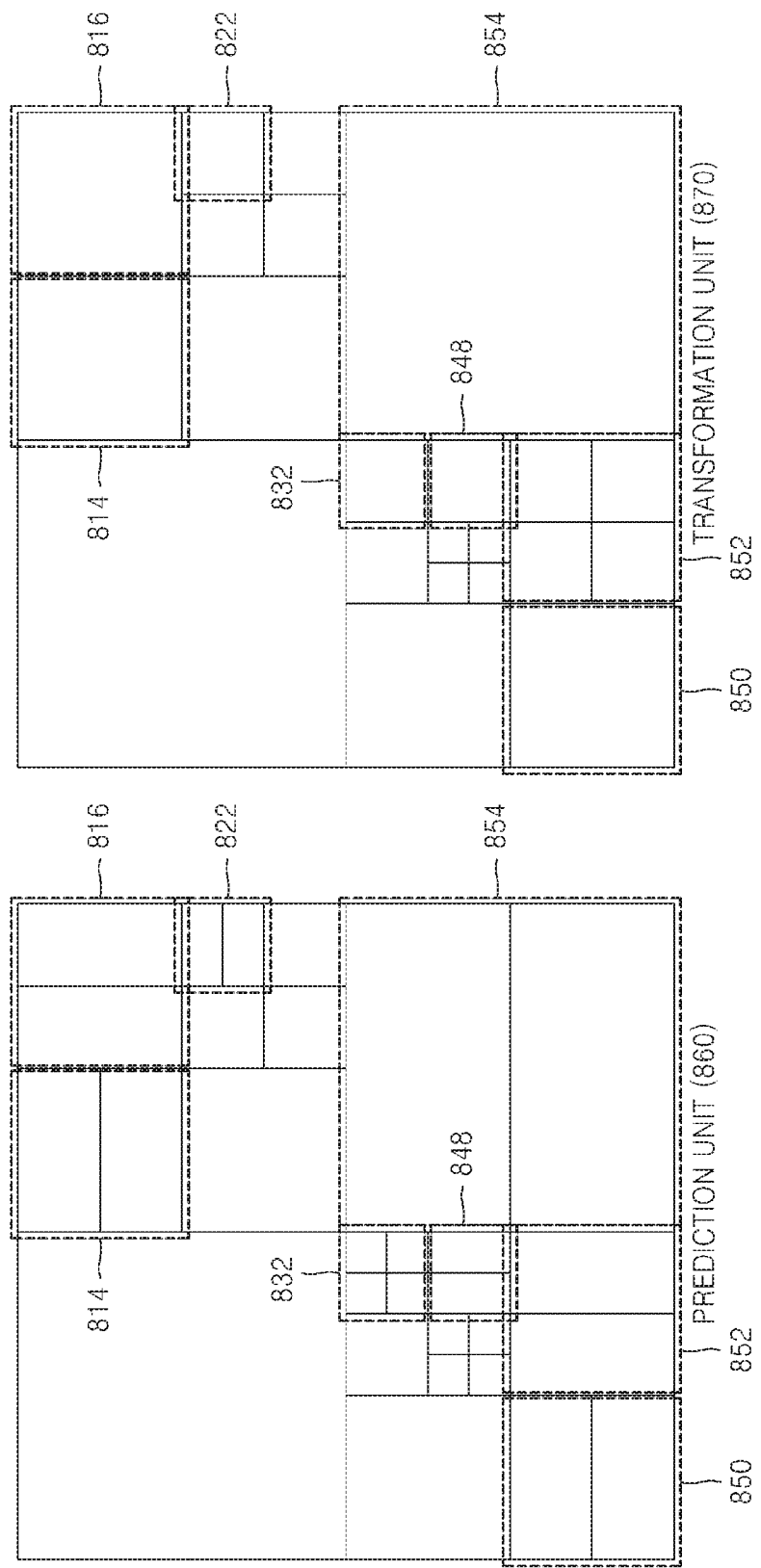

FIGS. 8A and 8B are diagrams showing split shapes of coding units, prediction units, and transformation units, according to an exemplary embodiment.

FIG. 8A shows coding units and prediction units according to an exemplary embodiment.

A left side of FIG. 8A shows a split shape selected by the image coding apparatus 100 illustrated in FIG. 1 in order to code a maximum coding unit 810. The image coding apparatus 100 splits and codes the maximum coding unit 810 into various shapes, compares the coded split shapes based on R-D costs, and selects an optimal split shape. If the optimal split shape corresponds to the maximum coding unit 810, the maximum coding unit 810 may be directly coded without splitting it as illustrated in FIG. 8A.

Referring to the left side of FIG. 8A, the maximum coding unit 810 having a depth of 0 is split and coded into sub coding units having depths equal to or greater than 1. The maximum coding unit 810 is split into four sub coding units having a depth of 1, and then all or some of the sub coding units having a depth of 1 are split into sub coding units having a depth of 2.

From among the sub coding units having a depth of 1, the top right sub coding unit and the bottom left sub coding unit are split into sub coding units having depths equal to or greater than 2. Some of the sub coding units having depths equal to or greater than 2 may be split into sub coding units having depths equal to or greater than 3.

A right side of FIG. 8A shows a split shape of a prediction unit 860 regarding the maximum coding unit 810.

Referring to the right side of FIG. 8A, the prediction unit 860 regarding the maximum coding unit 810 may be split differently from the maximum coding unit 810. In other words, a prediction unit regarding each sub coding unit may be smaller than the sub coding unit.

For example, from among sub coding units having a depth of 1, a prediction unit regarding a bottom right sub coding unit 854 may be smaller than the sub coding unit 854. From among sub coding units 814, 816, 818, 828, 850, and 852 having a depth of 2, prediction units regarding some sub coding units 815, 816, 850, and 852 may be smaller than the sub coding units 815, 816, 850, and 852. Also, prediction units regarding sub coding unit 822, 832, and 848 having a depth of 3 may be smaller than the sub coding unit 822, 832, and 848. A prediction unit may have a shape obtained by dividing each sub coding unit into two in a direction of its height or width, or a shape obtained by dividing each sub coding unit into four in a direction of its height and width.

FIG. 8B shows prediction units and transformation units according to an exemplary embodiment.

A left side of FIG. 8B shows a split shape of the prediction unit 860 regarding the maximum transformation unit 810 illustrated at the left side FIG. 8A, and a right side of FIG. 8B shows a split shape of a transformation unit 870 regarding the maximum transformation unit 810.

Referring to the right side of FIG. 8B, the transformation unit 870 may be split differently from the prediction unit 860.

For example, although a prediction unit regarding the coding unit 854 having a depth of 1 is selected as a shape obtained by dividing a height of the coding unit 854 in half, a transformation unit regarding the coding unit 854 may be selected as a size equal to the size of the coding unit 854. Likewise, although prediction units regarding the coding units 814 and 850 having a depth of 2 are selected as shapes obtained by dividing heights of the coding units 814 and 850 in half, transformation units regarding the coding units 814 and 850 may be selected as sizes equal to the sizes of the coding units 814 and 850.

A transformation unit may be selected as a size less than the size of a prediction unit. For example, if a prediction unit regarding the coding unit 852 having a depth of 2 is selected as a shape obtained by dividing a width of the coding unit 852 in half, a transformation unit may be selected as a shape having a size less than the size of the prediction unit and obtained by dividing a height and width of the coding unit 852 in half. The smallest transformation unit having a size of 2×2 may also be set. A transformation unit may also be set regardless of a size of a coding unit, e.g., a size greater than the size of the coding unit.

Entropy coding and decoding processes performed by the entropy coder 450 of the image coding apparatus 400 illustrated in FIG. 4, and the entropy decoder 520 of the image decoding apparatus 500 illustrated in FIG. 5 will now be described in detail.

As described above in relation to FIGS. 4 and 5, the image coding apparatus 400 and the image decoding apparatus 500 code a maximum coding unit or sub coding units split from and having sizes less than the size of the maximum coding unit. The size of a transformation unit for performing orthogonal transformation in a coding process may be selected to achieve the highest compression rate regardless of a coding unit and a prediction unit. For example, if a current coding unit has a size of 64×64, orthogonal transformation may be performed by using a transformation unit having a size of 32×32. Also, a transformation unit having a size greater than the size of a coding unit may be set. In a related art coding process, e.g., H.264, residual data transformed and quantized based on a transformation unit having a relatively small size, e.g., 4×4, is entropy coded. However, according to an exemplary embodiment, since a transformation unit to be entropy coded (hereinafter referred to as a 'transformation block') may have a relatively large size of 16×16, 32×32, 64×64, or 128×128 as well as 4×4 or 8×8 and thus, a length of a run, which represents the number of continuous coefficients having a value 0 between significant transformation coefficients having non-zero values, may be increased, a large run value is to be appropriately coded. Also, according to the related art technology, in order to code information of coefficients included in a transformation block, last_significant_coeff_flag that is a syntax element representing whether each significant transformation coefficient is a last significant transformation coefficient is entropy coded together with a significance map representing locations of significant transformation coefficients having non-zero values. However, if a transformation block is entropy coded together with the significance map and last_significant_coeff_flag, it should be determined whether each significant transformation coefficient is a last significant transformation coefficient in an entropy decoding process. Thus, according to the related art technology, data representing entire significant transformation coefficients may not be easily and directly identified from a received bitstream. Therefore, according to exemplary embodiments, a method of efficiently entropy coding and decoding information about a location of a last significant transformation coefficient in a transformation block having a large size is provided.

Figure 9:
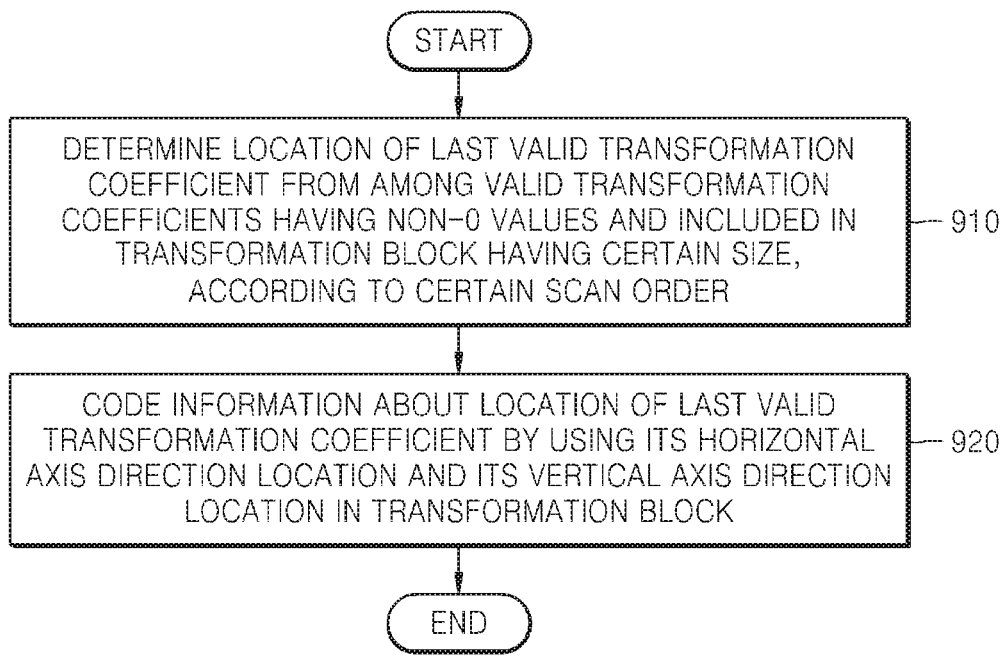
FIG. 9 is a flowchart of a method of entropy coding transformation coefficients, according to an exemplary embodiment.

FIG. 9 is a flowchart of a method of entropy coding transformation coefficients, according to an exemplary embodiment.

Referring to FIG. 9, in operation 910, the entropy coder 450 determines a location of a last significant transformation coefficient from among significant transformation coefficients having non-zero values and included in a transformation block having a certain size, according to a certain scan order. In more detail, if a transformation block including transformation coefficients obtained by performing transformation and quantization processes is input, the entropy coder 450 determines significant transformation coefficients included in a transformation block according to a certain scan order, e.g., a zigzag scan order, and determines a location of a last significant transformation coefficient that is scanned lastly.

In operation 920, the entropy coder 450 codes information about the location of the last significant transformation coefficient by using its horizontal axis direction location and its vertical axis direction location in the transformation block. If the last significant transformation coefficient is located at an x-th location (x is an integer equal to or greater than 0) in a horizontal axis direction, and a y-th location (y is an integer equal to or greater than 0) in a vertical axis direction, from a top left location of the transformation block, the entropy coder 450 codes the values x and y representing the location of the last significant transformation coefficient. According to a related art technology, last_significant_coeff_flag representing whether each significant transformation coefficient is a last significant transformation coefficient is coded. However, according to an exemplary embodiment, only coordinate information representing a location of a last significant transformation coefficient in a transformation block is coded. The information about the location of the last significant transformation coefficient may be coded by using a context-adaptive binary arithmetic coding (CABAC) method or a variable length coding (VLC) method. A method of coding the information about the location of the last significant transformation coefficient by using CABAC or VLC will be described below.

After the information about the location of the last significant transformation coefficient is coded, the entropy coder 450 codes level information of each significant transformation coefficient located in the transformation block. As the level information, the entropy coder 450 codes a sign vale and an absolute value of each significant transformation coefficient.

Figure 10:
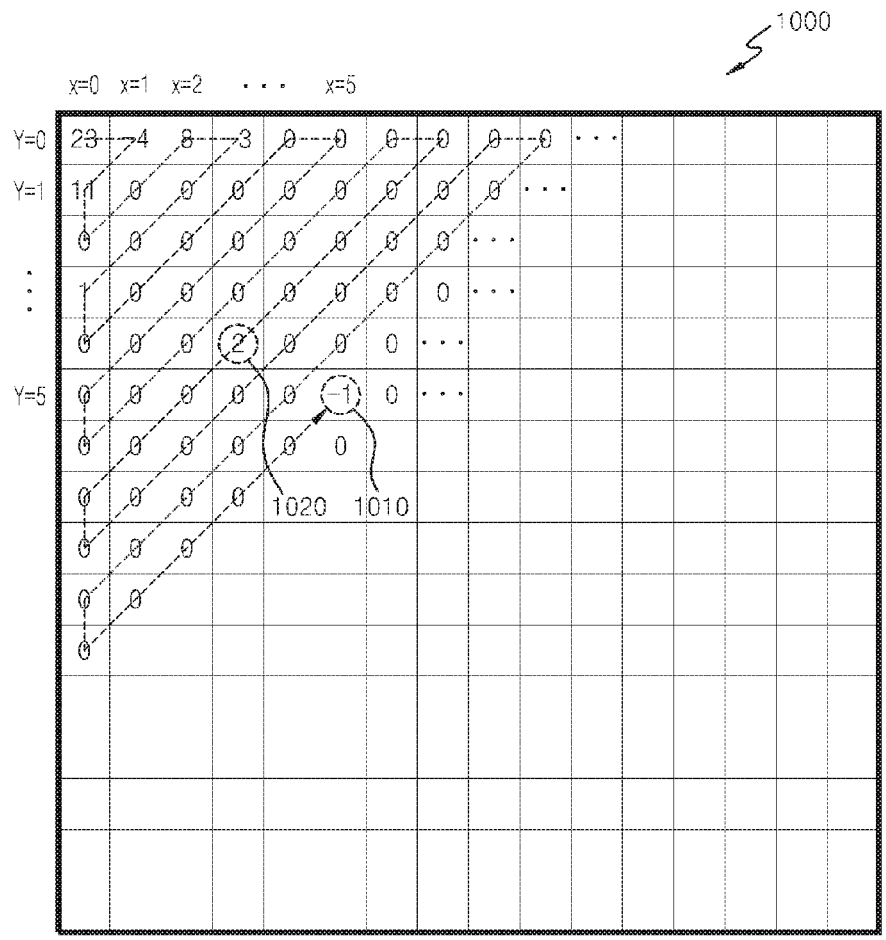
FIG. 10 is a reference diagram for describing a process of entropy coding transformation coefficients, according to exemplary embodiments.

FIG. 10 is a reference diagram for describing a process of entropy coding transformation coefficients, according to exemplary embodiments.

Referring to FIG. 10, the entropy coder 450 scans transformation coefficients in a transformation block 1000 according to a zigzag scan order. It is assumed that all empty spaces in FIG. 10 represent transformation coefficients having a value '0'. In FIG. 10, a last significant transformation coefficient is a transformation coefficient 1010 having a value '−1'. As illustrated in FIG. 10, the last significant transformation coefficient 1010 having a value '−1' is located at a 5th location in a horizontal axis direction and a 5th location in a vertical axis direction, from a top left transformation coefficient. Accordingly, the entropy coder 450 codes values x=5 and y=5 as information about a location of the last significant transformation coefficient information 1010.

Figure 11:
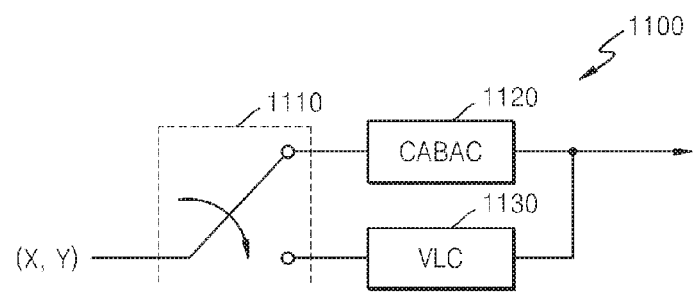
FIG. 11 is a block diagram of an entropy coding apparatus according to an exemplary embodiment.

FIG. 11 is a block diagram of an entropy coding apparatus 1100 according to an exemplary embodiment.

Referring to FIG. 11, the entropy coding apparatus 1100 includes a switch 1110, a context-adaptive binary arithmetic coder (CABAC) 1120, and a variable length coder (VLC) 1130.

As described above in relation to FIG. 9, if a location of a last significant transformation coefficient is determined, information about the location of the last significant transformation coefficient is coded by using CABAC or VLC. The switch 1110 controls information about the location of the last significant transformation coefficient, which is coded in units of a slice, a picture, and a picture group, to be output to the CABAC 1120 or the VLC 1130. Whether to code the information by using CABAC or VLC may also be determined by comparing R-D costs obtained by using CABAC and VLC.

A method of coding the information about the location of the last significant transformation coefficient by using CABAC will now be described.

Figure 12:
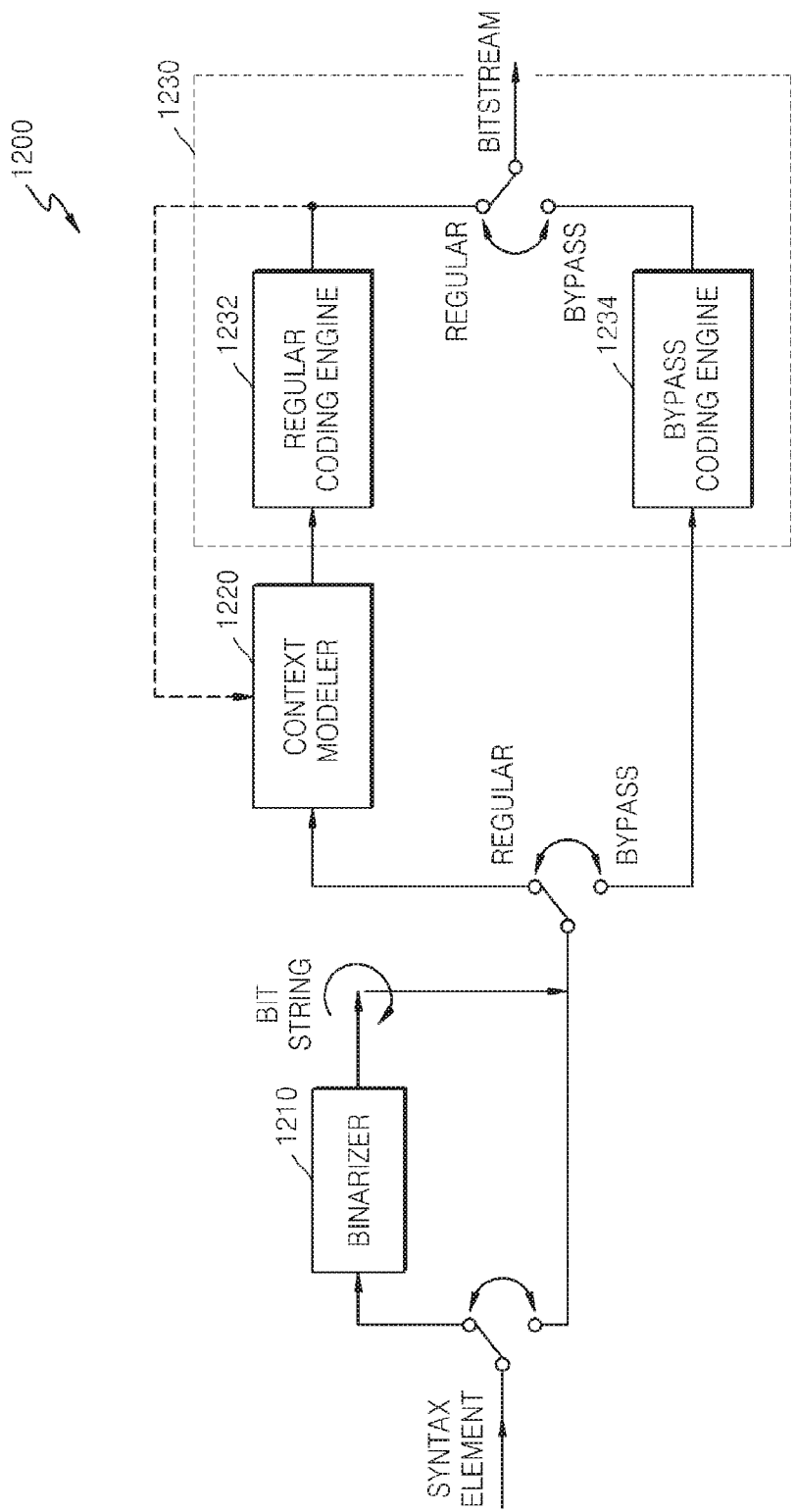
FIG. 12 is a block diagram of a context-adaptive binary arithmetic coding (CABAC) device according to an exemplary embodiment.

FIG. 12 is a block diagram of a CABAC device 1200 according to an exemplary embodiment.

Referring to FIG. 12, the CABAC device 1200 mainly includes a binarizer 1210, a context modeler 1220, and a binary arithmetic coder 1230. Also, the binary arithmetic coder 1230 includes a regular coding engine 1232 and a bypass coding engine 1234.

The binarizer 1210 transforms a horizontal axis direction location x and a vertical axis direction location y in a transformation block, which represent a location of a last significant transformation coefficient, into binary values and outputs bin strings. A bin represents each bit of the bin string. A method of binarizing information about the location of the last significant transformation coefficient includes various binarization methods such as unary binarization, truncated unary binarization, concatenated unary/k-th order exponential Golomb binarization, and fixed length binarization. For example, in FIG. 10, if the location of the last significant transformation coefficient is represented as X=5 and Y=5, the values X and Y may be binarized into X=000001 and Y=000001 by using truncated unary binarization.

The information about the location of the last significant transformation coefficient, which is mapped to the binary values by the binarizer 1210, is input to the context modeler 1220. The context modeler 1220 determines a probability model used to code the currently input bins, i.e., a context, based on the input bin values or a previously coded syntax element. In particular, according to an exemplary embodiment, one of previously determined contexts may be selected according to the location of the last significant transformation coefficient.

The regular coding engine 1232 generates a bitstream by arithmetically coding the input bin values based on the probability model determined by the context modeler 1220.

The bypass coding engine 1234 is an engine for outputting an input value without compressing the input value, and codes data such as pulse code modulation (PCM) data.

FIG. 13 is a reference diagram for describing a process of selecting a context for coding information about a location of a last significant transformation coefficient, according to an exemplary embodiment.

The context modeler 1220 selects one of a plurality of previously prepared contexts according to the location of the last significant transformation coefficient. The plurality of contexts classify '0' and '1' of a binary signal into a most probable symbols (MPS) and a least probable symbols (LPS) according to the location of the last significant transformation coefficient, and set probability values of the MPS and the LPS. Which symbol of '0' and '1' is set as an MPS or an LPS, and how to set probability values of the MPS and the LPS may be designed according to necessity. FIG. 13 shows contexts selected according to the location of the last significant transformation coefficient except for a top left location corresponding to a DC when transformation coefficients in a transformation block is scanned according to a zigzag scan order. Referring to FIG. 13, the context modeler 1220 includes three contexts having indices 0, 1, and 2 with respect to a 4×4 transformation block, and selects one of the three contexts having indices 0, 1, and 2 according to the location of the last significant transformation coefficient from among locations in the 4×4 transformation block except for a top left location. That is, the context having an index 0 is selected if the last significant transformation coefficient is located at (1,0) in the 4×4 transformation block, the context having an index 1 is selected if the last significant transformation coefficient is located at (0,1), and the context having an index 2 is selected if the last significant transformation coefficient is located at (1,1). Likewise, the context modeler 1220 includes seven contexts having indices 0 to 6 with respect to an 8×8 transformation block, and selects one of the seven contexts having indices 0 to 6 according to the location of the last significant transformation coefficient from among locations in the 8×8 transformation block except for a top left location. Similarly, the context modeler 1220 includes twelve contexts having indices 0 to 11 with respect to a 16×16 transformation block, and selects one of the twelve contexts having indices 0 to 11 according to the location of the last significant transformation coefficient from among locations in the 16×16 transformation block except for a top left location.

The regular coding engine 1232 generates a bitstream by arithmetically coding the input bin values representing the location of the last significant transformation coefficient, based on the context determined by the context modeler 1220. For example, it is assumed that a horizontal axis direction location of the last significant transformation coefficient, i.e., X, has a value 3, and that the binarizer 1210 generates a bin string '010' by binarizing the value 3. It is also assumed that, based on the context selected by the context modeler 1220 according to the location of the last significant transformation coefficient, an MPS is '0' having a probability value 0.8 and an LPS is '1' having a probability value 0.2. The regular coding engine 1232 updates a period [0,1] into a period [0,0.8] by splitting it according to the probability value of '0' that is an initial bin for forming the bin string '010', and updates the period [0,0.8] into a new period [0.64,0.8] according to the probability value of '1' that is a next bin. Also, the regular coding engine 1232 updates the period [0.64,0.8] into a new period [0.64,0.768] according to the probability value of '0' that is a last bin. The regular coding engine 1232 outputs '11' obtained by excluding an initial digit from '0.11' that is a binary number of a real number 0.75 included in the period [0.64,0.768], as a code word corresponding to the value 3 representing the horizontal axis direction location of the last significant transformation coefficient. Likewise, the regular coding engine 1232 binarizes a coordinate value Y representing a vertical axis direction location of the last significant transformation coefficient, and generates a bitstream by coding the binarized coordinate value Y according to the selected context.

In addition to the above-described information about the location of the last significant transformation coefficient, the CABAC 1120 illustrated in FIG. 11 codes coded_block_flag representing whether a significant transformation coefficient having a non-zero value exists in a transformation block, and significant_coeff_flag representing a location of each significant transformation coefficient in the transformation block. A coding process of coded_block_flag and significant_coeff_flag may be the same as the related art H.264 coding process. For example, referring to FIG. 14 showing a significance map 1400 corresponding to FIG. 10, the significance map 1400 may be represented by setting significant_coeff_flag[i] as 1 if a transformation coefficient having an i-th scan order is a significant transformation coefficient, and setting significant_coeff_flag[i] as 0 if the transformation coefficient having an i-th scan order is 0. The significance map 1400 may be coded by using fifteen probability models as in H.264.

After the information about the location of the last significant transformation coefficient is coded, the entropy coder 450 codes level information of each significant transformation coefficient located in the transformation block.

Figure 15:
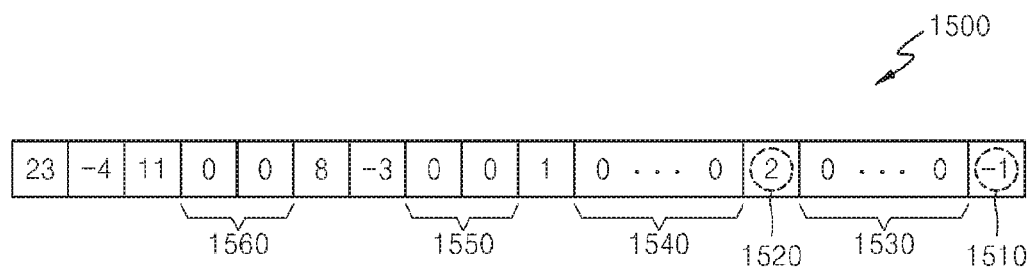
FIG. 15 is a reference diagram for describing a process of coding level values of significant transformation coefficients included in a transformation block illustrated in FIG. 10.

FIG. 15 is a reference diagram for describing a process of coding level values of significant transformation coefficients included in the transformation block 1000 illustrated in FIG. 10.

Referring to FIGS. 10 and 15, the entropy coder 450 scans the transformation coefficients illustrated in FIG. 10 from the top left transformation coefficient to the last significant transformation coefficient according to a zigzag scan order and obtains one-dimensionally aligned transformation coefficients as illustrated in FIG. 15.

The entropy coder 450 codes the one-dimensionally aligned transformation coefficients by using a run representing the number of continuous coefficients having a value 0 between significant transformation coefficients, and a level representing a value of each significant transformation coefficient, as in related art H.264. In more detail, the entropy coder 450 determines the run and the level in an order opposite to the scan order, i.e., in a direction from a right side to a left side of FIG. 15, and codes the run and the level by using a certain VLC table.

FIG. 16 is diagram showing an example of a plurality of VLC tables VLC0 through VLC8 used according to an exemplary embodiment. The entropy coder 450 may select one of the VLC tables VLC0 through VLC8 according to the location of the last significant transformation coefficient and may code the run and the level by using the selected VLC table. For example, as illustrated in FIG. 15, VLC is performed on runs 1530, 1540, 1550, and 1560 representing the numbers of continuous transformation coefficients having a value 0 between significant transformation coefficients from a last significant transformation coefficient 1510 having a value '−1', by using the VLC table.

Since a transformation block according to an exemplary embodiment may have a large size equal to or greater than 16×16, a run value may be increased. For example, if a VLC table covers run values only from 0 to 63 and a run value is greater than 63, the value may not be coded by using the VLC table. Accordingly, according to an exemplary embodiment, in consideration of a maximum run value available by a VLC table, if a transformation block has a run value greater than the maximum run value, the entropy coder 450 codes run values equal to or less than the maximum run value and then codes the other run values. For example, if the maximum run value is 63 and a run value to be coded is 70, the run value 70 is split into run values 63 and 7 and the run values 63 and 7 are separately coded as run information.

According to another exemplary embodiment, the location (x, y) of the last significant transformation coefficient may also be coded by using VLC other than the above-described CABAC. That is, the entropy coder 450 may perform VLC on the values x and y with reference to a VLC table previously prepared according to the values x and y.

FIG. 17 is a reference diagram for describing a method of entropy coding transformation coefficients, according to another exemplary embodiment.

According to the current exemplary embodiment, the entropy coder 450 splits a transformation block into sub blocks having a certain size, and codes information about a location of a last significant transformation coefficient in a sub block including the last significant transformation coefficient, together with an index of the sub block. In FIG. 17, it is assumed that (Sa,b) represents a transformation coefficient in a sub block a and having a bth scan index. Referring to FIG. 17, if it is assumed that the last significant transformation coefficient is (S1,12) in a sub block 1 1771, the entropy coder 450 codes (2,2) representing the location of the last significant transformation coefficient (S1,12) in the sub block 1 1771 as the information about the location of the last significant transformation coefficient in the sub block, together with a certain index representing the sub block 1 1771.

Referring back to FIG. 10, according to another exemplary embodiment, transformation coefficients are coded by using the last significant transformation coefficient information 1010 in the transformation block 1000 (hereinafter referred to as a 'first last significant transformation coefficient') and a significant transformation coefficient 1020 previous to the first last significant transformation coefficient 1010 (hereinafter referred to as a 'second last significant transformation coefficient'). In more detail, the entropy coder 450 codes (3,4) representing the location of the second last significant transformation coefficient 1020 as described above. Then, the entropy coder 450 codes a run value between the first and second last significant transformation coefficients 1010 and 1020. As described above, if the location of the second last significant transformation coefficient 1020 is known, the location of the first last significant transformation coefficient 1010 may be obtained by adding the run value between the first and second last significant transformation coefficients 1010 and 1020 to the location of the second last significant transformation coefficient 1020.

Figure 18A:
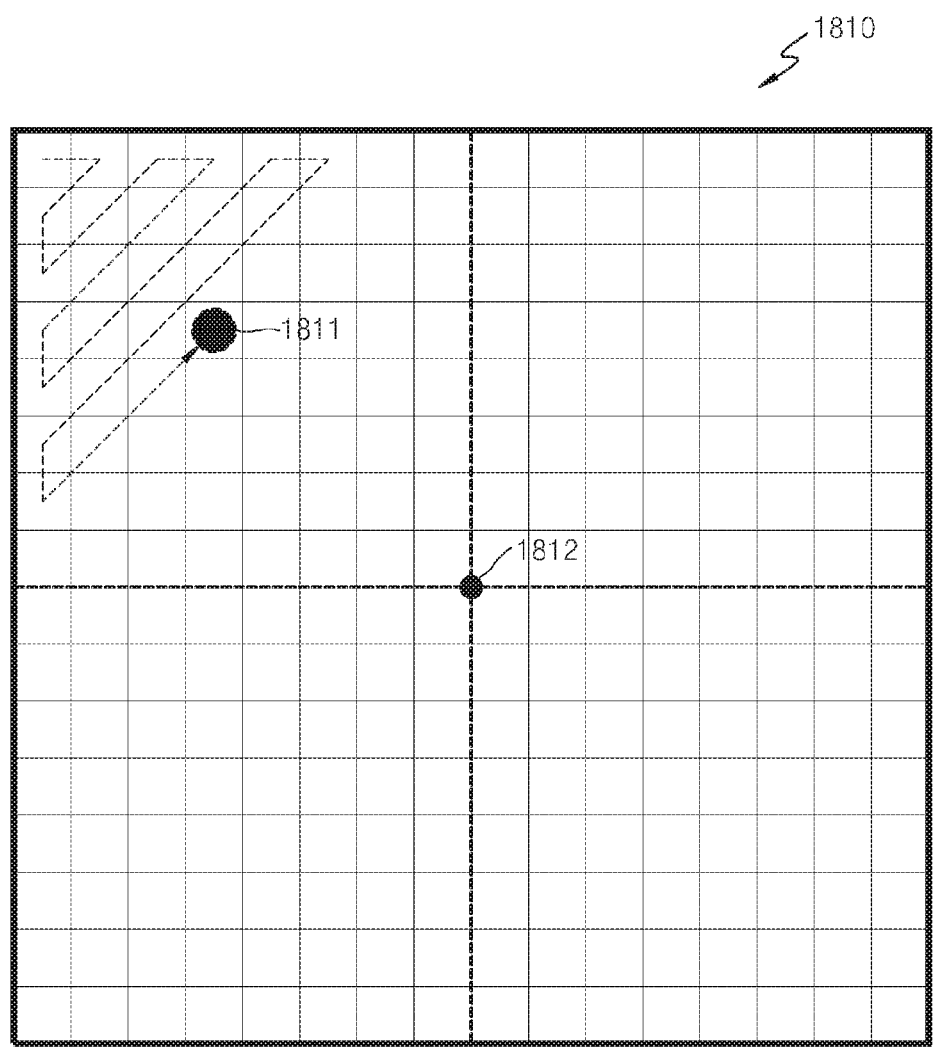
FIGS. 18A and 18B are reference diagrams for describing a method of entropy coding transformation coefficients, according to another exemplary embodiment.
Figure 18B:
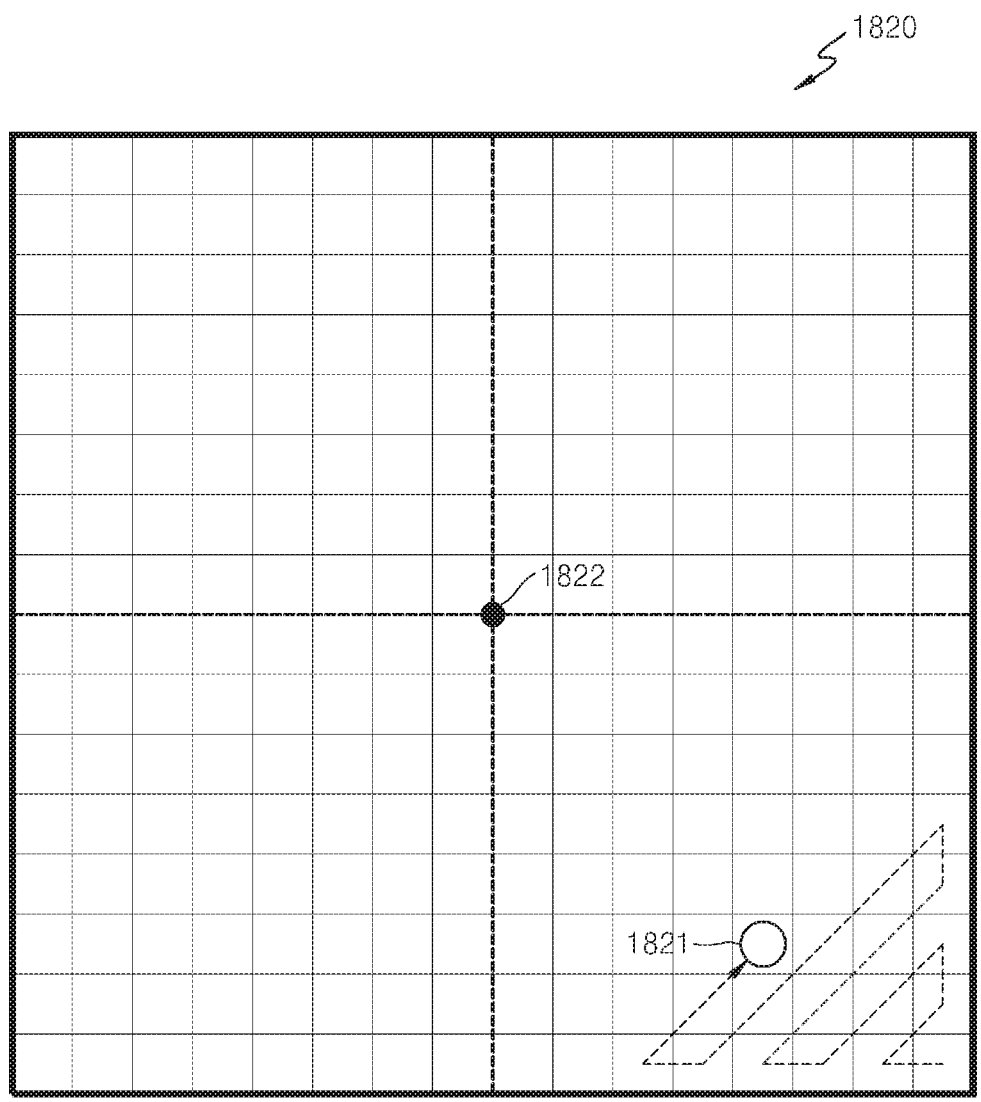

FIGS. 18A and 18B are reference diagrams for describing a method of entropy coding transformation coefficients, according to another exemplary embodiment.

The entropy coder 450 may select a scan direction corresponding to one of a zigzag scan order and an inverse zigzag scan order according to in which order a last significant transformation coefficient is scanned first, that is, according to whether the last significant transformation coefficient is close to a top left location or a bottom right location of a transformation block, and may code information about a location of the last significant transformation coefficient together with an index representing the selected scan direction. For example, as illustrated in FIG. 18A, if reference numeral 1812 denotes a central location, a last significant transformation coefficient 1811 is located closer to the top left location. In this case, the entropy coder 450 may code information about a location of the last significant transformation coefficient 1811 together with an index (a forward scan index) representing a scanning direction from the top left location. Also, as illustrated in FIG. 18B, if reference numeral 1822 denotes a central location and a last significant transformation coefficient 1821 is located closer to the bottom right location, the entropy coder 450 may code information about a location of the last significant transformation coefficient 1821 together with an index (a backward scan index) representing a scanning direction from the bottom right location.

According to another exemplary embodiment, in order to code a run value, a certain global run may be set and the run value may be represented by using a quotient and a remainder obtained when the run value is divided by the global run (run refinement). For example, it is assumed that the run value is 78 and the global run has a value 16. In this case, when 78 is divided by 16, a quotient is 4 and a remainder is 14. Accordingly, the run value 78 may be represented by using 16 that is the value of the global run, 4 that is the value of the quotient, and 14 that is the value of the remainder. The entropy coder 450 may code information about the global run, the quotient, and the remainder by using VLC or CABAC. If a coder and a decoder previously set the same global run, information about the global run may not be additionally coded.

Also, according to another exemplary embodiment, the entropy coder 450 may code information about a location of a last significant transformation coefficient by applying different VLC tables according to the size of a transformation block including the last significant transformation coefficient.

Figure 19:
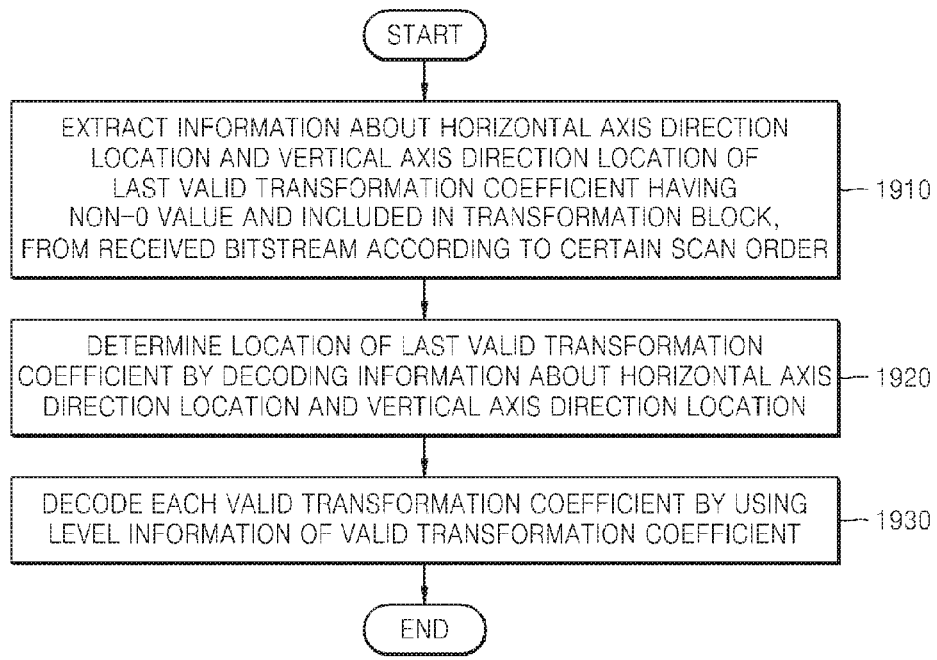
FIG. 19 is a flowchart of a method of entropy decoding transformation coefficients, according to an exemplary embodiment.

FIG. 19 is a flowchart of a method of entropy decoding transformation coefficients, according to an exemplary embodiment.

Referring to FIG. 19, in operation 1910, the entropy decoder 520 extracts information about a horizontal axis direction location and a vertical axis direction location of a last significant transformation coefficient having a non-zero value and included in a transformation block, from a received bitstream according to a certain scan order. As described above in relation to FIG. 9, if the last significant transformation coefficient is located at an x-th location (x is an integer equal to or greater than 0) in a horizontal axis direction, and a y-th location (y is an integer equal to or greater than 0) in a vertical axis direction, from a top left location of the transformation block, information about a location of the last significant transformation coefficient include the values x and y.

In operation 1920, the entropy decoder 520 determines a location of the last significant transformation coefficient by decoding the information about the horizontal axis direction location and the vertical axis direction location. The entropy decoder 520 decodes the information about the location of the last significant transformation coefficient by using context-adaptive binary arithmetic decoding (CABAD) or variable length decoding (VLD) as an inverse process to the coding process performed by the entropy coder 450, and determines the location of the last significant transformation coefficient. In more detail, the entropy decoder 520 may perform VLD on the horizontal axis direction location and the vertical axis direction location of the last significant transformation coefficient with reference to a certain VLC look-up table. Also, the entropy decoder 520 may select one of a plurality of contexts according to the location of the last significant transformation coefficient, and may perform CABAD on the information about the location of the last significant transformation coefficient according to the selected context.

In operation 1930, the entropy decoder 520 decodes run and level information included in the bitstream, by using the location of the last significant transformation coefficient. If a length of a run is greater than a certain threshold value, the entropy decoder 520 decodes run information of a length to the threshold value, and then decodes run information of a length greater than the threshold value. As described above in relation to FIG. 16, if the threshold value is set to code run values to 63, a run value 70 is split into run values 63 and 7 and then the run values 63 and 7 are separately coded. Thus, the entropy decoder 520 may decode the run value 70 by separately decoding and then combining the run values 63 and 7.

Figure 20:
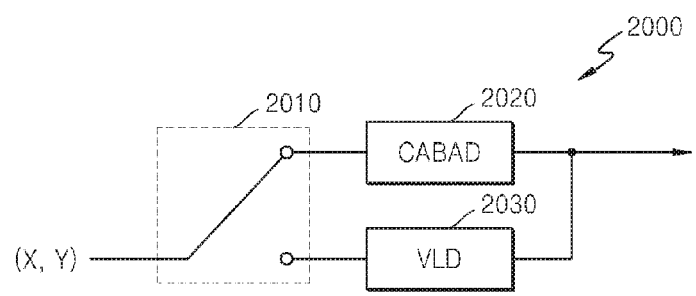
FIG. 20 is a block diagram of an entropy decoding apparatus according to an exemplary embodiment.

FIG. 20 is a block diagram of an entropy decoding apparatus 2000 according to an exemplary embodiment.

Referring to FIG. 20, the entropy decoding apparatus 2000 includes a switch 2010, a CABAD 2020, and a VLD 2030.

The switch 2010 outputs information about coded transformation coefficients to one of the CABAD 2020 and the VLD 2030 by using coding mode information of the transformation coefficients, which is set in units of a slice, a picture, and a picture group.

The VLD 2030 may perform VLD on a horizontal axis direction location and a vertical axis direction location of a last significant transformation coefficient with reference to a certain VLC look-up table. Also, the CABAD 2020 may select one of a plurality of contexts according to the location of the last significant transformation coefficient, and may perform CABAD on information about the location of the last significant transformation coefficient according to the selected context.

Exemplary embodiments can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion.

While exemplary embodiments have been particularly shown and described above, it will be understood by one of ordinary skill in the art that various changes in form and details may be made therein without departing from the spirit and scope of the inventive concept as defined by the following claims. Therefore, the scope of the inventive concept is defined not by the detailed description of exemplary embodiments but by the following claims, and all differences within the scope will be construed as being included in the present inventive concept.

The invention claimed is:

1. A method of video decoding, performed by at least one processor, the method comprising:

obtaining, from a bitstream, a transformation block information indicating whether at least one significant coefficient exists among transformation coefficients of a transformation block;

when the transformation block information indicates existence of the at least one significant coefficient, obtaining, from a bitstream, an x index indicating an x coordinate of a last significant coefficient, from among the transformation coefficients of the transformation block, and a y index indicating a y coordinate of the last significant coefficient;

determining a scan index of the last significant coefficient based on the x index and the y index;

obtaining, from the bitstream, level information of the last significant coefficient;

reconstructing the last significant coefficient using the level information of the last significant coefficient;

obtaining, from the bitstream, a significant coefficient flag and level information of a first transformation coefficient which has a smaller scan index than the scan index of the last significant coefficient among the transformation coefficients;

reconstructing the first transformation coefficient by using the significant coefficient flag and the level information of the first transformation coefficient; and performing inverse transformation on the transformation block using transformation coefficients including the last significant coefficient and the first transformation coefficient, wherein the significant coefficient flag indicates whether a level of the first transformation coefficient is zero or non-zero, and wherein the level information of the first transformation coefficient indicates the level of the first transformation coefficient is greater than 1, when the significant coefficient flag indicates the level of the first transformation coefficient is non-zero.

2. A method of video encoding, performed by at least one processor, the method comprising:

generating a transformation block information indicating whether at least one significant coefficient exists among transformation coefficients of a transformation block;

when the at least one significant coefficient exists, generating an x index indicating an x coordinate of a last significant coefficient, from among the transformation coefficients of the transformation block, and a y index indicating a y coordinate of the last significant coefficient;

generating level information of the last significant coefficient; and generating a significant coefficient flag and level information of a first transformation coefficient which has a smaller scan index than a scan index of the last significant coefficient among the transformation coefficients, wherein:

the scan index of the last significant coefficient is determined based on the x index and the y index, the significant coefficient flag is generated to indicate whether a level of the first transformation coefficient is zero or non-zero, and wherein, when the level of the first transformation coefficient is non-zero, the level information of the first transformation coefficient is generated to indicate whether the level of the first transformation coefficient is greater than 1.

3. An apparatus for video encoding, the apparatus comprising at least one processor configured to:
- generate a transformation block information indicating whether at least one significant coefficient exists among transformation coefficients of a transformation block;
- when the at least one significant coefficient exists, generating an x index indicating an x coordinate of a last significant coefficient, from among the transformation coefficients of the transformation block, and a y index indicating a y coordinate of the last significant coefficient;
- generate level information of the last significant coefficient; and
- generate a significant coefficient flag and level information of a first transformation coefficient which has a smaller scan index than a scan index of the last significant coefficient among the transformation coefficients, wherein:
the scan index of the last significant coefficient is determined based on the x index and the y index,
the significant coefficient flag is generated to indicate whether a level of the first transformation coefficient is zero or non-zero, and
wherein, when the level of the first transformation coefficient is non-zero, the level information of the first transformation coefficient is generated to indicate whether the level of the first transformation coefficient is greater than 1.

4. A non-transitory computer-readable storage medium storing a bitstream to be decoded by at least one processor for performing video decoding, the bitstream comprising:
- a transformation block information indicating whether at least one significant coefficient exists among transformation coefficients of a transformation block,
- an x index indicating an x coordinate of a last significant coefficient, from among the transformation coefficients of the transformation block;
- a y index indicating a y coordinate of the last significant coefficient;
- level information of the last significant coefficient; and
- a significant coefficient flag of a first transformation coefficient which has a smaller scan index than a scan index of the last significant coefficient among the transformation coefficients; and
- level information of the first transformation coefficient, wherein:
the scan index of the last significant coefficient is determined based on the x index and the y index,
the bitstream further includes the significant coefficient flag to indicate whether a level of the first transformation coefficient is zero or non-zero, and
when the level of the first transformation coefficient is non-zero, the bitstream further includes the level information of the first transformation coefficient to indicate whether the level of the first transformation coefficient is greater than 1.

\* \* \* \* \*